(12) United States Patent
Snelgrove et al.

(10) Patent No.: US 11,941,405 B2
(45) Date of Patent: *Mar. 26, 2024

(54) COMPUTATIONAL MEMORY

(71) Applicant: UNTETHER AI CORPORATION, Toronto (CA)

(72) Inventors: William Martin Snelgrove, Toronto (CA); Darrick John Wiebe, Toronto (CA)

(73) Assignee: UNTETHER AI CORPORATION, Toronto (CA)

(*) Notice: Subject to any disclaimer, the term of this patent is extended or adjusted under 35 U.S.C. 154(b) by 0 days.

This patent is subject to a terminal disclaimer.

(21) Appl. No.: 18/227,092

(22) Filed: Jul. 27, 2023

(65) Prior Publication Data

US 2023/0409338 A1 Dec. 21, 2023

Related U.S. Application Data

(63) Continuation of application No. 18/126,574, filed on Mar. 27, 2023, which is a continuation of application
(Continued)

(51) Int. Cl.
*G06F 9/30* (2018.01)
*G06F 9/38* (2018.01)
(Continued)

(52) U.S. Cl.
CPC .......... *G06F 9/3887* (2013.01); *G06F 9/3001* (2013.01); *G06F 9/30101* (2013.01);
(Continued)

(58) Field of Classification Search
CPC .. G06F 9/3887; G06F 9/3001; G06F 9/30101; G06F 12/0284; G06F 13/1668;
(Continued)

(56) References Cited

U.S. PATENT DOCUMENTS 4,635,250 A * 1/1987 Georgiou ............... H04Q 3/521
379/291
4,896,265 A * 1/1990 Fiduccia ............. G06F 15/8023
712/28

(Continued)

FOREIGN PATENT DOCUMENTS

JP 2002207706 A 7/2002
JP 2007108913 A 4/2007

OTHER PUBLICATIONS

ISA/CA, International Search Report and Written Opinion, dated Nov. 20, 2018, re PCT International Patent Application No. PCT/IB2018/056687.
(Continued)

*Primary Examiner* — Cheng Yuan Tseng
(74) *Attorney, Agent, or Firm* — Perry + Currier Inc.

(57) ABSTRACT

An example device includes a plurality of computational memory banks. Each computational memory bank of the plurality of computational memory banks includes an array of memory units and a plurality of processing elements connected to the array of memory units. The device further includes a plurality of single instruction, multiple data (SIMD) controllers. Each SIMD controller of the plurality of SIMD controllers is contained within at least one computational memory bank of the plurality of computational memory banks. Each SIMD controller is to provide instructions to the at least one computational memory bank.

20 Claims, 25 Drawing Sheets

Related U.S. Application Data

No. 16/975,097, filed as application No. PCT/IB2018/056687 on Aug. 31, 2018, now Pat. No. 11,614,947, which is a continuation-in-part of application No. 15/903,754, filed on Feb. 23, 2018, now Pat. No. 11,514,294.

(60) Provisional application No. 62/648,074, filed on Mar. 26, 2018.

(51) Int. Cl.
*G06F 12/02* (2006.01)
*G06F 13/16* (2006.01)
*G06F 13/28* (2006.01)
*G06F 13/40* (2006.01)
*G06F 15/78* (2006.01)
*G06N 3/045* (2023.01)
*G06N 3/063* (2023.01)

(52) U.S. Cl.
CPC ...... *G06F 12/0284* (2013.01); *G06F 13/1668* (2013.01); *G06F 13/287* (2013.01); *G06F 13/4068* (2013.01); *G06F 15/7821* (2013.01); *G06N 3/045* (2023.01); *G06N 3/063* (2013.01); *G06F 2212/1028* (2013.01)

(58) Field of Classification Search
CPC .............. G06F 13/287; G06F 13/4068; G06F 15/7821; G06F 2212/1028; G06N 3/045
See application file for complete search history.

(56) References Cited

U.S. PATENT DOCUMENTS

| | | | | |
|---|---|---|---|---|
| 4,973,956 A * | 11/1990 | Lin | ................... | H04Q 3/521 340/2.2 |
| 5,264,842 A * | 11/1993 | Franaszek | ............ | H04Q 3/645 340/2.25 |
| 5,475,856 A * | 12/1995 | Kogge | ............... | G06F 9/3885 712/E9.055 |
| 5,535,410 A * | 7/1996 | Watanabe | ......... | G06F 9/30189 712/E9.035 |
| 5,546,343 A * | 8/1996 | Elliott | ............... | G06F 15/8015 365/189.12 |
| 5,581,767 A * | 12/1996 | Katsuki | ............ | G06F 15/8023 712/14 |
| 5,606,707 A * | 2/1997 | Tomassi | ............... | G06T 1/20 358/448 |
| 5,619,676 A * | 4/1997 | Fukuda | ............ | G06F 12/0862 711/213 |
| 5,659,780 A * | 8/1997 | Wu | .................. | G06F 15/8015 712/19 |
| 5,669,010 A * | 9/1997 | Duluk, Jr. | ............ | H04N 19/61 375/E7.1 |
| 5,717,943 A * | 2/1998 | Barker | ............. | G06F 9/30189 712/E9.055 |
| 5,797,027 A * | 8/1998 | Kajiura | ............ | G06F 15/17337 712/22 |
| 5,892,962 A * | 4/1999 | Cloutier | ............ | G06F 15/7867 712/16 |
| 5,956,274 A | 9/1999 | Elliott et al. | | |
| 5,960,211 A * | 9/1999 | Schwartz | ............ | G06F 15/80 712/15 |
| 6,243,730 B1 * | 6/2001 | Wang | ............... | G06F 17/147 708/401 |
| 6,279,088 B1 | 8/2001 | Elliott et al. | | |
| 6,298,162 B1 * | 10/2001 | Sutha | ............... | G06T 1/20 382/234 |
| 6,560,684 B2 | 5/2003 | Elliott et al. | | |
| 6,680,915 B1 * | 1/2004 | Park | ............... | G06F 15/16 370/254 |
| 6,717,945 B1 * | 4/2004 | Jue | ............... | H04L 47/33 370/395.71 |
| 6,803,782 B2 * | 10/2004 | Koob | ............... | H03K 17/693 326/38 |
| 6,806,737 B2 | 10/2004 | Sung et al. | | |
| RE38,955 E * | 1/2006 | Shirley | ............ | G11C 11/4096 365/63 |
| 7,046,522 B2 | 5/2006 | Sung et al. | | |
| 7,155,581 B2 | 12/2006 | Elliott et al. | | |
| 7,546,438 B2 * | 6/2009 | Chung | ............ | G06Q 20/3576 717/109 |
| 8,209,597 B2 * | 6/2012 | Felch | ............... | G06F 1/32 714/822 |
| 8,385,419 B2 * | 2/2013 | Stojancic | ............ | H04N 19/523 348/721 |
| 8,952,976 B2 * | 2/2015 | Danilin | ............... | G06F 15/16 345/536 |
| 9,767,864 B1 * | 9/2017 | Penney | ............... | G11C 7/065 |
| 9,768,785 B2 * | 9/2017 | Schultz | ............... | H03K 21/023 |
| 9,798,550 B2 * | 10/2017 | Stewart | ............... | G06F 9/3824 |
| 10,153,042 B2 * | 12/2018 | Ehrman | ............... | G11C 15/04 |
| 10,175,839 B2 | 1/2019 | Scrivastava et al. | | |
| 10,331,282 B2 | 6/2019 | Scrivastava et al. | | |
| 10,437,252 B1 * | 10/2019 | Liu | ............... | G01C 21/3878 |
| 10,838,910 B2 * | 11/2020 | Zhang | ............... | G06F 15/8046 |
| 10,901,939 B2 * | 1/2021 | Gokmen | ............... | G06F 15/80 |
| 10,996,959 B2 * | 5/2021 | Morad | ............... | G06F 9/3877 |
| 11,043,259 B2 * | 6/2021 | Wentzlaff | ............... | H03K 19/21 |
| 11,115,613 B2 * | 9/2021 | Doege | ............... | H04N 25/75 |
| 11,514,294 B2 * | 11/2022 | Snelgrove | ............ | G06F 9/3887 |
| 11,614,947 B2 * | 3/2023 | Snelgrove | ............ | G06F 13/287 712/22 |
| 2001/0041012 A1 * | 11/2001 | Hsieh | ............... | G06F 7/76 375/240.2 |
| 2006/0155955 A1 * | 7/2006 | Gschwind | ............ | G06F 15/8007 712/10 |
| 2018/0253639 A1 * | 9/2018 | Snelgrove | ............ | G06N 3/063 |
| 2020/0394046 A1 * | 12/2020 | Snelgrove | ............ | G06F 13/287 |
| 2023/0069360 A1 * | 3/2023 | Snelgrove | ............ | G06F 9/3887 |

OTHER PUBLICATIONS

Koob, John C., et al. "Design of a 3-D fully depleted SOI computational RAM." IEEE Transactions on Very Large Scale Integration (VLSI) Systems 13.3 (2005): 358-369.

Bouknight, Wendell J., et al. "The illiac iv system." Proceedings of the IEEE 60.4 (1972): 369-388.

Elliott, Duncan G., W. Martin Snelgrove, and Michael Stumm. "Computational RAM: A memory-SIMD hybrid and its application to DSP." Custom Integrated Circuits Conference, 1992., Proceedings of the IEEE 1992. IEEE, 1992.

Le, T. M., Snelgrove, W. M., & Panchanathan, S. (Mar. 1998). SIMD processor arrays for image and video processing: a review. In Multimedia Hardware Architectures 1998 (vol. 3311, pp. 30-42). International Society for Optics and Photonics.

Park, Jong Won. "Multiaccess memory system for attached SIMD computer." IEEE Transactions on Computers 53.4 (2004): 439-452.

Elliott, D. G., Computational RAM, a memory-SIMD hybrid (Doctoral dissertation, National Library of Canada). University of Toronto. 1998. 191 pages.

Le, Thinh Minh. Computational* RAM implementations of vector quantization for image and video compression. University of Ottawa (Canada), 1995. 150 pages.

Cojocaru, Christian. "Computational RAM: implementation and bit-parallel architecture." Thesis. Carleton Univeristy, Ottawa, Canda. (1996): 179 pages.

Elliot, Duncan, et al. "Computing RAMs for media processing." Multimedia Hardware Architectures 1997. vol. 3021. International Society for Optics and Photonics, 1997.

"Yeap, T.H., "Design of a VASTOR Processing Element Suitable for VLSI Layout", Dissertation, Toronto, 1984".

(56) References Cited

OTHER PUBLICATIONS

Loucks, W. M et al., "Vastor: A microprocessor based associative vector processor for small scale applications." Proc. of the 1980 International Conf. on Parallel Processing. 1980.

* cited by examiner

| R0 | R1 | $\overline{Ci}$ | $\overline{Co}$ | Z |
|---|---|---|---|---|
| 0 | 0 | 0 | 1 | 1 |
| 0 | 0 | 1 | 1 | 0 |
| 0 | 1 | 0 | 0 | 0 |
| 0 | 1 | 1 | 1 | 1 |
| 1 | 0 | 0 | 0 | 0 |
| 1 | 0 | 1 | 1 | 1 |
| 1 | 1 | 0 | 0 | 1 |
| 1 | 1 | 1 | 0 | 0 |

FIG. 8

COMPUTATIONAL MEMORY

CROSS-REFERENCE TO RELATED APPLICATIONS

This application claims priority to U.S. 62/648,074, filed Mar. 26, 2018 and incorporated herein by reference. This application is a continuation-in-part of U.S. Ser. No. 15/903,754, filed Feb. 23, 2018 and incorporated herein by reference.

TECHNICAL FIELD

The present invention relates to computational memory and neural networks.

BACKGROUND

Deep learning has proven to be a powerful technique for performing functions that have long resisted other artificial intelligence approaches. For example, deep learning may be applied to recognition of objects in cluttered images, speech understanding and translation, medical diagnosis, gaming, and robotics. Deep learning techniques typically apply many layers (hence "deep") of neural networks that are trained (hence "learning") on the tasks of interest. Once trained, a neural network may perform "inference", that is, inferring from new input data an output consistent with what it has learned.

Neural networks, which may also be called neural nets, perform computations analogous to the operations of biological neurons, typically computing weighted sums (or dot products) and modifying the results with a memoryless nonlinearity. However, it is often the case that more general functionality, such as memory, multiplicative nonlinearities, and "pooling", are also required.

In many types of computer architecture, power consumption due to physically moving data between memory and processing elements is non-trivial and is frequently the dominant use of power. This power consumption is typically due to the energy required to charge and discharge the capacitance of wiring, which is roughly proportional to the length of the wiring and hence to distance between memory and processing elements. As such, processing a large number of computations in such architectures, as generally required for deep learning and neural networks, often requires a relatively large amount of power. In architectures that are better suited to handle deep learning and neural networks, other inefficiencies may arise, such as increased complexity, increased processing time, and larger chip area requirements.

SUMMARY

An example device includes a plurality of computational memory banks. Each computational memory bank of the plurality of computational memory banks includes an array of memory units and a plurality of processing elements connected to the array of memory units. The device further includes a plurality of single instruction, multiple data (SIMD) controllers. Each SIMD controller of the plurality of SIMD controllers is contained within at least one computational memory bank of the plurality of computational memory banks. Each SIMD controller is to provide instructions to the at least one computational memory bank.

This and other examples will be discussed in detail below.

BRIEF DESCRIPTION OF THE DRAWINGS

FIG. 8 is a table of an example arithmetic operation of the arithmetic logic unit, according to the present invention.

DETAILED DESCRIPTION

The techniques described herein may allow for the processing of large numbers of dot-product and related neural-network computations with flexible low-precision arithmetic, power-efficient communications, and local storage and decoding of instructions and coefficients.

The computations involved in deep learning can be considered as an interplay of memory and processing elements. Memory is required for the input data, the weights of weighted sums, the intermediate results passed between layers, control and connection information and other functions. Data in memory is processed in processing elements or PEs, such as, for example, the CPU of a general-purpose computer, the tables of a Turing machine, or the processors of a graphics processor, and returned to memory.

Deep learning and neural networks can benefit from low-power designs that implement various types of calculations in an energy-efficient manner. Low-power implementations encourage use in mobile or isolated devices, where reducing battery power consumption is important, and use at large scale where the need to cool the processing and memory elements can be a limiting factor.

In "Computational RAM: A Memory-SIMD Hybrid", Elliott describes "pitch-matching narrow 1-bit [processing elements] to the memory and restricting communications to one-dimensional interconnects". Such a design is intended to reduce the distance between memory and processing elements to the order of a micron, where the chip-to-chip distances required by conventional computer architectures are at the scale of millimeters or centimeters—thousands or tens of thousands times greater. Elliott summarizes earlier work including earlier academic work by Loucks, Snelgrove, and Zaky dating back to "VASTOR: a microprocessor-based associative vector processor for small-scale applications," Intl. Conf. on Parallel Processing, pp. 37-46, August 1980. Elliott named this technology "C*RAM" or Computational Random-Access Memory (RAM).

Elliott and others detail possible designs for the extremely simple processing elements required for pitch matching, including circuits required for one-dimensional communications. It is also possible to slightly loosen the pitch-matching constraint from a one-to-one correspondence of memory columns with PEs, such as, for example, allowing each PE to occupy the width of four memory columns. This reduces the number of PEs and may be necessary or more practical for very dense memories.

Figure 1:
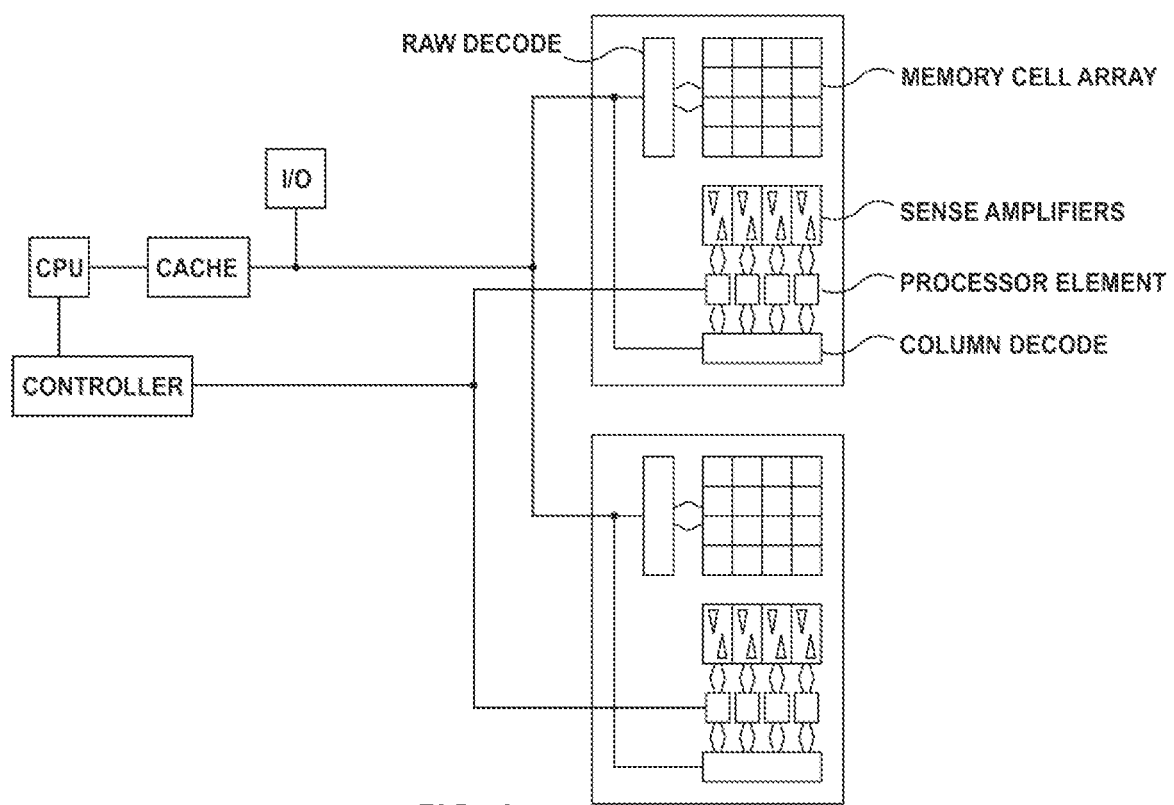
FIG. 1 is a schematic diagram of a prior art computer system in which processing elements are embedded in memory.

In U.S. Pat. No. 5,546,343 Elliott and Snelgrove describe the use of a multiplexer as an arithmetic and logic unit (ALU) operable to implement any function of three bits of state of a processing element. As shown in FIG. 1, in this type of design, a single off-chip controller is used.

In "Computational RAM: Implementation and Bit-Parallel Architecture", Cojocaru describes grouping one-bit processing elements so as to allow multi-bit calculations, adding specialized hardware to accelerate binary arithmetic, and adding registers to reduce the need for memory access.

Yeap describes suitable one-bit processing elements for C*RAM in "Design of a VASTOR processing element suitable for VLSI layout," A. H. Yeap, M.A.Sc., University of Toronto, 1984.

In "Computational*RAM Implementations of Vector Quantization for Image and Video Compression", Le describes algorithms suitable for image and video compression with computational RAM.

The implementations mentioned above are deficient for low-power deep learning applications in several respects. First, their one-dimensional communication may make it difficult to deal with large two-dimensional images having many channels. Further, their complex opcode is generally unnecessarily large and therefore power-hungry for common arithmetic operations. Substantial chip area may be occupied by the opcode and communications buses. Moreover, their processing elements cannot perform permutations or related mappings, nor table lookups or operations that vary from processor to processor. In addition, these approaches tend to rely on off-chip controllers, which consume substantial power in communicating with the computational RAM proper. Finally, they are generally pure single instruction stream, multiple data stream devices, which can handle consistent operations on large datasets well, but which cannot share their processing resources when several smaller tasks are required.

In recognition of these and other disadvantages of past attempts, the techniques described herein aim to improve computational memory to handle large numbers of dot-product and related neural-network computations with flexible low-precision arithmetic, provide power-efficient communications, and provide local storage and decoding of instructions and coefficients.

Figure 2:
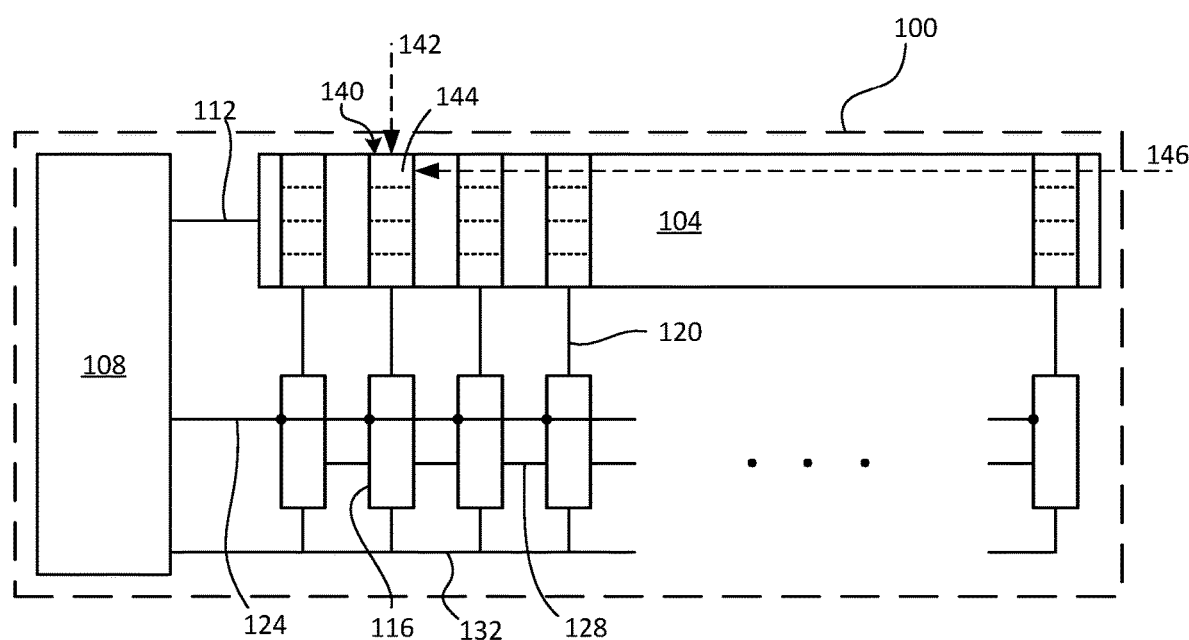
FIG. 2 is a block diagram of a computational memory bank, according to the present invention.

FIG. 2 shows a bank 100 of computational memory, which may be termed C*RAM, according to an embodiment of the present invention. The computational memory bank 100 includes an array of memory units 104 and a plurality of processing elements 116 connected to the array of memory units 104.

The computational memory bank 100 further includes a single instruction, multiple data (SIMD) controller 108 contained within the computational memory bank 100. The SIMD controller 108 provides instructions and, optionally, data to the computational memory bank 100. In this embodiment, the SIMD controller 108 is provided to only the one computational memory bank 100. In other embodiments, the SIMD controller 108 may be shared among several computational memory banks 100.

Further, in this embodiment, the array of memory units 104 is generally rectangular in shape and the SIMD controller 108 is located near a narrow end of the array. The SIMD controller 108 may be provided on either side of the array of memory units 104, i.e., on the right or the left, as depicted. This may provide for a space-efficient arrangement of the array of memory units 104, the SIMD controller 108, and the plurality of processing elements 116, such that a plurality of banks 100 may be arranged in a rectangular or square arrangement that may provide an efficient layout on a semiconductor substrate or chip.

Each unit 140 of the array of memory units 104 may include a column 142 of memory cells 144. A cell 144 may be configured to store one bit of information. The cells 144 at the same relative position in a plurality of columns 142 may form a row 146 of cells 144. The units 140 of the array of memory units 104 may also be arranged in a row, where such a row of units 140 includes a plurality of rows 146 of cells 144. In this embodiment, each column 142 of cells 144 is connected to a different processing element 116 by a bit line 120. In other embodiments, multiple columns 142 of cells 144 are connected to each different processing element 116 by bit lines 120.

The array of memory units 104 is connected to the SIMD controller 108 by one or more row select lines 112, which may also be termed word lines. The SIMD controller 108 may output a signal on the select lines 112 to select a row 146 of cells 144. As such, a row 146 of the memory array 104 may be addressed by the SIMD controller 108 through row select lines 112, causing selected bits in the columns 142 to be available to processing elements 116 through bit lines 120.

The SIMD controller 108 may include instruction memory that may be loaded from the array of memory units 104.

In this embodiment, the array of memory units 104 is static random-access memory (SRAM). For example, each memory cell 144 may be a formed of six transistors, such as metal-oxide-semiconductor field-effect transistors (MOSFETs) and may be termed a 6T memory.

In other embodiments, other types of memory may be used, such as dynamic RAM, ferroelectric RAM, magnetic RAM, or a combination of different types of memory. 1T, 2T, 5T, etc. SRAM memory cells may be used. Memory particularly adaptable to the present invention is memory that has row addressing that simultaneously enables corresponding bits on the columns and memory that may be structured in a pitch-matched layout with the SIMD controller 108 and the processing elements 116.

The array of memory units 104 may be split into subsets having different access energy costs. For example, a "heavy" subset may have memory cells with larger capacitance, due to longer bit lines, that therefore take more power to access but have increased density. A "light" subset may have memory cells with lower capacitance that take less power to access but that have lower density. As such, power consumption and space efficiency may be improved when the heavy subset is used to store information subject to lower frequency of access, such as coefficients and program code, and the light subset is used for information subject to higher frequency of access, such as intermediate results.

The processing elements 116 are arranged along the width of the array of memory units 104 and are positioned as near to the array of memory units 104 as practical. The processing elements 116 may be arranged in a linear array and assigned addresses in sequence. In this embodiment, each processing element 116 is connected to and aligned with a column 142 of the array of memory units 104.

Addressing of the processing elements 116 may be big endian or little endian and may start from the left or the right based on implementation preferences.

The processing elements 116 may be structurally identical to one another. A large number of relatively simple and substantially structurally identical processing elements 116 may benefit applications in neural networks, as neural networks often demand the processing of a large number of coefficients. In this context, substantially structurally identical means that small differences required by implementation, such as hardwired addresses and differing connections of end-most processing elements, are contemplated. An array of repeated and simplified processing elements 116 may reduce design complexity and increase space efficiency in neural network applications.

Each processing element 116 may include registers and an ALU. Registers may include internal registers for performing operations with the processing element 116 and communications registers that communicate state with other processing elements 116. Each processing element 116 may further include communicated state provided by one or more other processing elements 116. The ALU may be configured to execute an arbitrary function, such as a function of one or more operands defined by an opcode.

The processing elements 116 may be connected to the SIMD controller 108 by any number and arrangement of row busses 124, 132. A row bus 124, 132 may be operable to unidirectionally or bidirectionally communicate information among any of the SIMD controller 108 and the plurality of processing elements 116. A row bus 132 may provide a degree of segmentation, so that a subset of the processing elements 116 may communicate via such a row bus 132. Segmentation of a row bus 132 may be permanent or may be enabled with switches that may be turned on or off by the SIMD controller 108 or a processing element 116. A row bus 124, 132 may be provided with a latch, which may enable data permutation, local operations, and similar functions. Although depicted as a line, a row bus 124, 132 may include any number lines. A row bus 124, 132 may be connected to the ALU of a processing element 116 to facilitate computation as well as reading data from and writing data to the bus 124, 132.

For example, a plurality of row busses 124, 132 may include an operand bus 124 and a general-purpose row bus 132. The operand bus 124 may be used to communicate operand selections from the SIMD controller 108 to the processing elements 116, such that each processing element 116 executes the same operations on local operands selected by the SIMD controller 108. The general-purpose row bus 132 may carry data and opcode information to complement the operand selections carried by the operand bus 124.

Processing-element row connections 128 may be provided to directly connect processing elements 116, such that a given processing element 116 may directly communicate with a neighboring or distant processing element 116 in the bank 100. The row connections 128 may allow for the sharing of state information, such as sum and carry values, and address information. The row connections 128 may facilitate row shift, which may be unidirectional (left or right) or bidirectional (left and right), and further may be circular. The row connections 128 may be configured to provide for shift to adjacent processing elements 116, such as the next bit in either/both directions, and to distant processing elements 116, such as processing elements 116 eight or some other number of bits away in either/both directions. One or more registers of the processing element 116 may be used to store information received via a row connection 128.

Processing-element row connections 128 may provide for ripple chains for carry, sum, or other outputs of the ALU. These values need not be latched and may depend on the values of local registers of the processing element 116 and values received from any buses. Dynamic logic, which may be pre-charged high, may be used, so that ripple functions may be monotonic decreasing when input is monotonic decreasing. Carry, which is a monotonic increasing function, may be made active-low, such that carry-ins are initially all high (i.e., pre-charged) and may change to low, but will not return high for a sum.

Among the processing elements 116 within the bank 100, there are at least four types of communications. First, synchronous communications may be performed using row connections 128 and associated communications registers. Second, asynchronous communications through a ripple-carry-type chain may be performed, via row connections 128, and two of such chains may transfer information in opposite directions in the linear array of processing elements 116. Two chains provide for multibit arithmetic (e.g., carry traveling left or right and sign extension traveling opposite) and may also be used for search and max-pool types of operations. Third, a processing element 116 may write information to a row bus 132 and such information may be read by the SIMD controller 108 or by another processing element 116. For example, a group of processing element 116 may write information to a segmented row bus 132, which may then be read by the SIMD controller 108 or by another group of processing element 116. Fourth, processing elements 116 in adjacent banks 100 may communicate synchronously. In various embodiments, any one or more of these four types of communications may be implemented.

As should be apparent from the above, the computational memory bank 100 is a space-efficient unit of controllable computational memory that is suitable to be reproduced, in an identical or substantially identical form, in a space-efficient pattern. Operations on data stored in the array of memory units 104 may be performed by the adjacent processing elements 116, so that operations may be performed in a parallel fashion while reducing or minimizing energy expended in transferring data back and forth between processor and memory.

Figure 3:
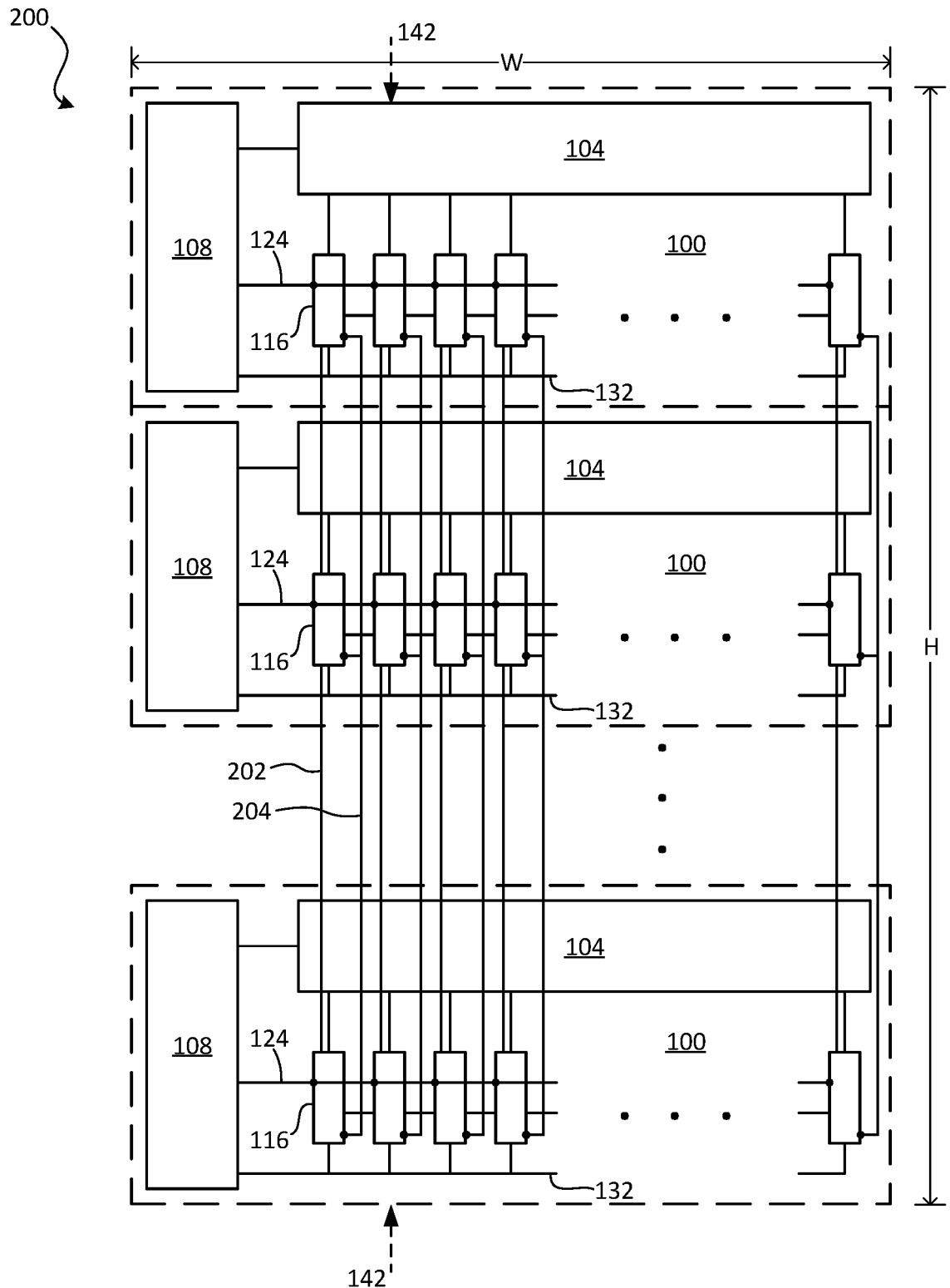
FIG. 3 is a block diagram of a device with a plurality of computational memory banks with processing elements connected by column buses, according to the present invention.

FIG. 3 shows an embodiment of a processing device 200 that may be constructed from a plurality of computational memory banks, such as the bank 100. Each computational memory bank 100 includes an array of memory units 104 and a plurality of processing elements 116, as described elsewhere herein.

A plurality of SIMD controllers 108 are provided to the computational memory banks 100 to provide instructions and, optionally, data to the banks 100. In this embodiment, each bank 100 includes its own different SIMD controller 108. This may provide for more fine-grained control, as opposed to a single controller shared by all the banks. Operation of the SIMD controllers 108 may be coordinated in a master/slave scheme, an interrupt/wait scheme, or similar.

Any number of banks 100 may be provided to the processing device 200. The size of each bank 100 and the arrangement of banks 100 may be selected to provide width, W, and height, H, dimensions for the device 200 to increase or maximize layout efficiency, such as efficient use of silicon, and at the same time reduce or minimize distance between processing and memory to reduce or minimize power requirements. The banks 100 may be arranged in a linear array and assigned addresses in sequence.

Addressing of the banks 100 may be big endian or little endian and may start from the top or the bottom based on implementation preferences.

The device 200 may include processing-element column connections 202 to connect processing elements 116 in different banks 100, such that a given processing element 116 may directly communicate with another processing element 116 in a neighboring or distant bank 100. The column connections 202 may facilitate column shift, which may be unidirectional (up or down) or bidirectional (up and down), and further may be circular. One or more registers of the processing element 116 may be used to store information received via a column connection 202.

The device 200 may include a column bus 204 to connect processing elements 116 of any number of computational memory banks 100. In this embodiment, a column 142 of memory spans the banks 100 and each processing element 116 associated with the same column 142 is connected by way of the column bus 204. Although it is depicted as a line, the column bus 204 may include any number of lines. Any number and arrangement of column busses 204 may be provided.

The processing elements 116 in different banks 100 may communicate with each other through the column bus 204. The column bus 204 may be operable to unidirectionally or bidirectionally communicate information among the connected processing elements 116. The column bus 204 may carry opcode information to complement information carried by other paths, such as the operand bus 124 within each bank 100. Any number and arrangement of column busses 204 may be provided. A given column bus may provide a given degree of segmentation, so that a subset of the processing elements 116 in a respective column 142 may communicate via such a column bus. Segmentation of a column bus 204 may be permanent or may be enabled with switches that may be turned on or off by the SIMD controller 108 or a processing element 116.

A row bus 132 connecting processing elements 116 within the banks 100 and a column bus 204 connecting processing elements 116 among the banks 100 allow for controllable two-dimensional communications of data and instructions within the processing device 200. This may improve the processing of large images, which may be mapped to rectangular or square area, so as to reduce or minimize communications distance and hence power demand. As such, the controllable two-dimensional communications provided by the busses 132, 204 may allow for efficient implementation of neural networks that process images or similar information.

Further, configuring the SIMD controllers 108 to match the height, H, of the banks 100 allows multiple controlled banks 100 to be placed in a space-efficient manner, one above the other, tiling in the column direction. This allows an approximately square array to be made, which can be advantageous for packaging, even when an individual bank 100 is very wide (i.e., in the row dimension or width, W) in relation to its height (i.e., in the column dimension or contributing portion of the total height, H). This may be useful for various practical RAM circuits and for having a large number of processors to amortize the area and power costs of a single SIMD controller 108.

In an example implementation, with reference to FIGS. 2 and 3, a processing device 200 includes 32 computational memory banks 100 each having an array of memory units 104 containing 4096 columns of memory. Within each bank 100, each column 142 contains 192 bits of memory connected to a processing element 116.

As should be apparent from the above, a processing device 200 may include a stack of computational memory banks 100 to increase processing capacity and allow for massively parallel operations, while maintaining a space-efficient overall layout of banks 100 and reducing or minimizing energy expended in transferring data back and forth between banks 100. The advantages of a single bank 100 may be replicated in the column direction and further the banks 100 may be provided with a way of communicating.

Figure 4:
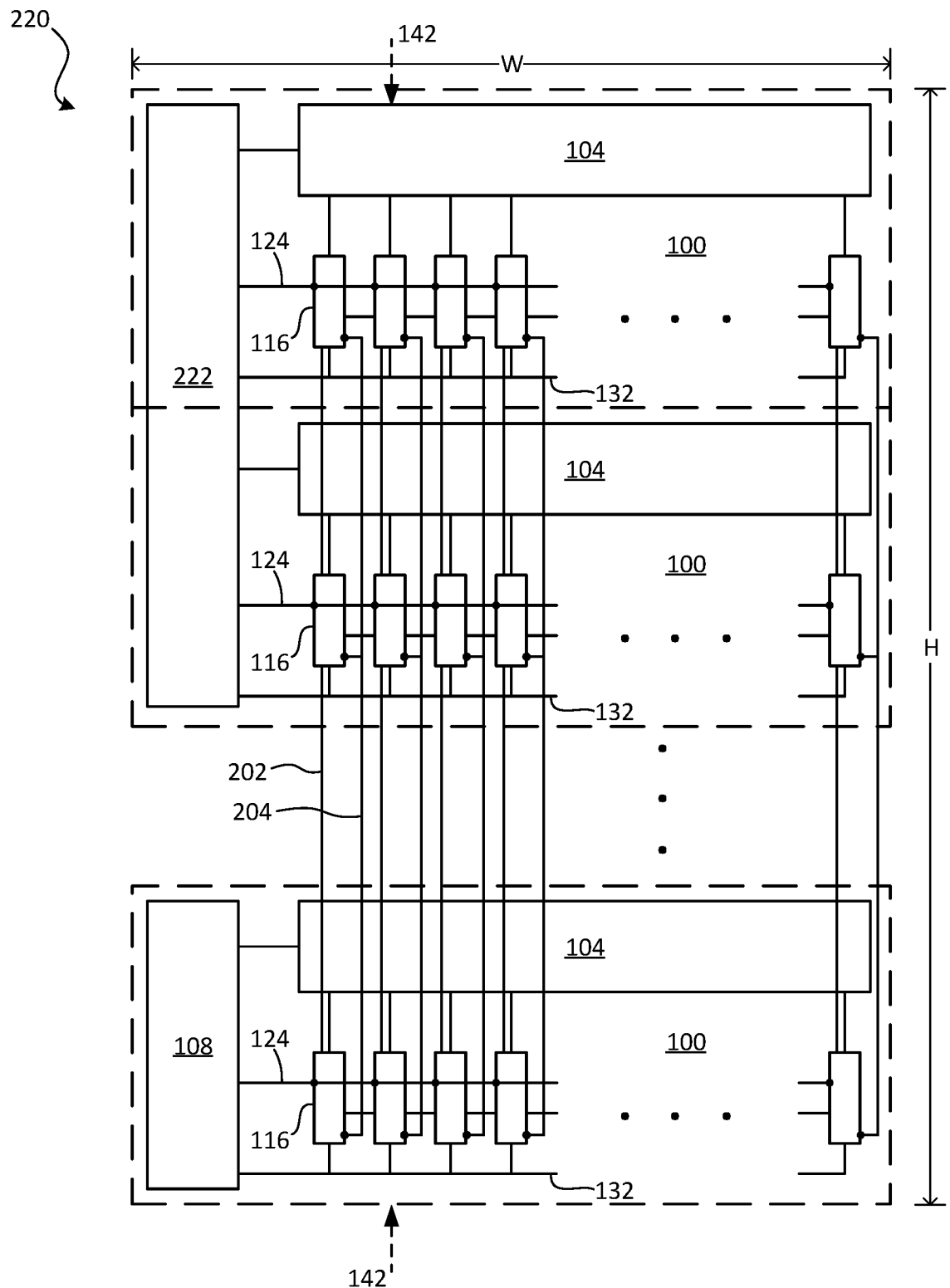
FIG. 4 is a block diagram of a device with a plurality of computational memory banks with a controller shared among several banks, according to the present invention.

FIG. 4 shows an embodiment of a processing device 220 that may be constructed from a plurality of computational memory banks, such as the bank 100. The processing device 220 is similar to other devices described herein and redundant description is omitted for sake of clarity. The related description of other embodiments may be referenced, with like reference numerals denoting like components.

A plurality of SIMD controllers 108, 222 are provided to the computational memory banks 100 to provide instructions and, optionally, data to the banks 100. In this embodiment, a SIMD controller 222 is contained within at least two of the computational memory banks 100. That is, a SIMD controller 222 may be shared by multiple computational memory banks 100. Any number of other banks 100 may include dedicated or shared SIMD controllers 108, 222.

Selecting the proportion of banks 100 that share controllers 222 to banks 100 that have their own dedicated controllers 108 allows for implementations that balance utilization of the processing elements, which drives towards increasing the number of dedicated controllers 108 so that smaller problems may be handled, with good area and power efficiency, which drive towards increasing the number of shared controllers 222 to limit duplication.

Figure 5:
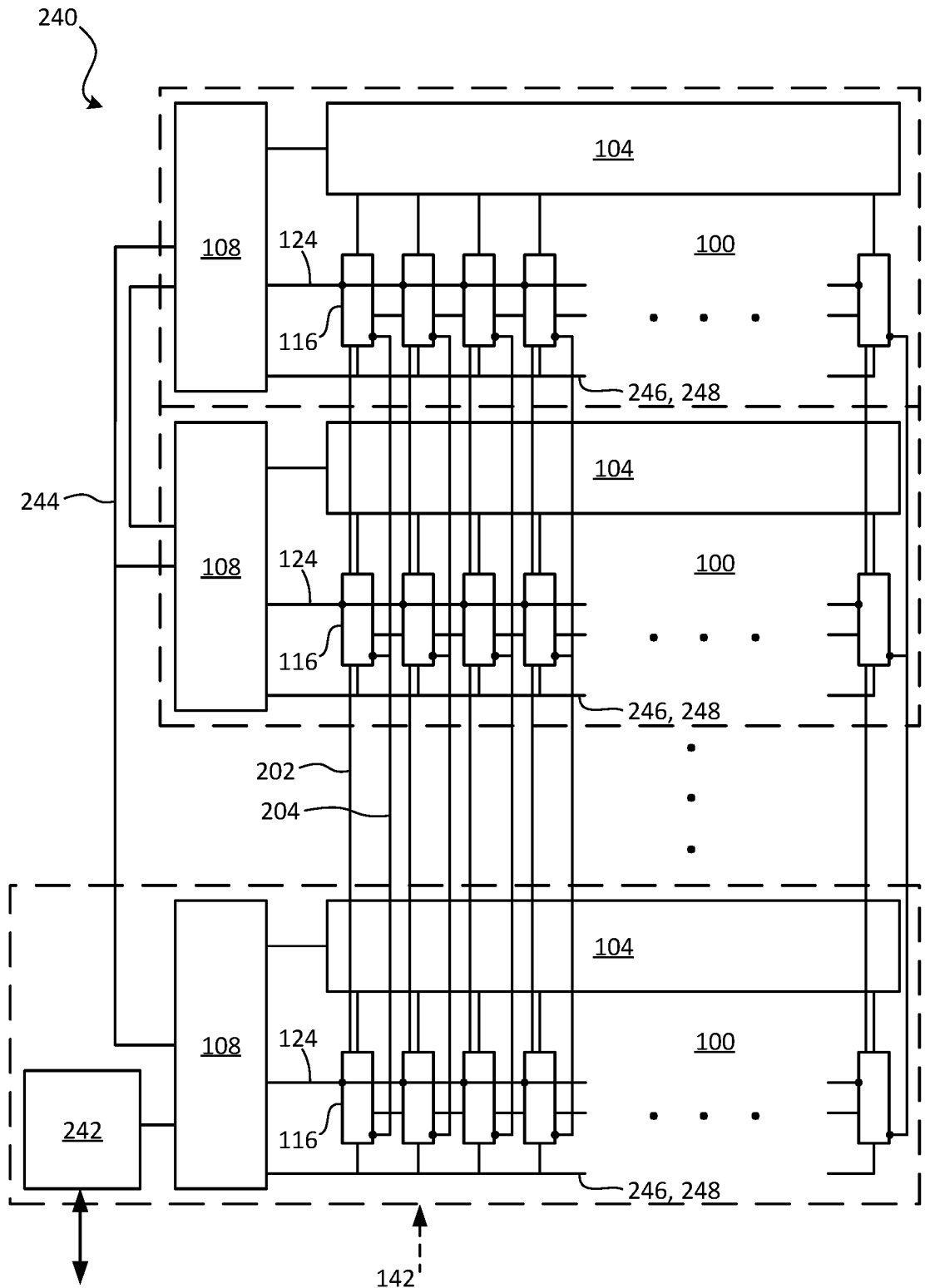
FIG. 5 is a block diagram of a device with a plurality of computational memory banks with an input/output circuit, according to the present invention.

FIG. 5 shows an embodiment of a processing device 240 that may be constructed from a plurality of computational memory banks, such as the bank 100. The processing device 240 is similar to other devices described herein and redundant description is omitted for sake of clarity. The related description of other embodiments may be referenced, with like reference numerals denoting like components.

Of the plurality of computational memory banks 100, at least one bank 100 includes an input/output circuit 242 for software-driven input/output. In this embodiment a bottommost bank 100 includes an input/output circuit 242 connected to its SIMD controller 108. Software-driven input/output may be provided by another device, such as a general-purpose processor, which may be co-located with the processing device 240 in the same larger device, such as a tablet computer, smartphone, wearable device, or similar. The input/output circuit 242 may include a Serial Peripheral Interface (SPI), a double data rate (DDR) interface, a Mobile Industry Processor Interface (MIPI), Peripheral Component Interconnect Express (PCIe), or similar. Any number of input/output circuits 242 may be provided to support any number of such interfaces.

The input/output circuit 242 may be configured to cause the SIMD controller 108 to perform operations. The SIMD controller 108 may be configured to cause the input/output circuit 242 to perform operations.

The input/output circuit 242 may be configured to reset the SIMD controllers 108 and read and write to registers of the SIMD controllers 108. Through the registers of a SIMD controller 108, the input/output circuit 242 can cause a SIMD controller 108 to perform operations, including writing instruction memory. As such, a startup process may include resetting a SIMD controller 108, writing boot code to the bottom of instruction memory, and releasing the reset, at which point the boot code executes.

In addition, a plurality of SIMD controllers 108 may be connected to a controller bus 244 to provide for mutual communications among the SIMD controllers 108. The input/output circuit 242 may also be connected to the controller bus 244 to communicate with the SIMD controllers 108, and such connection may be through the SIMD controller 108 of its bank 100, as depicted, or directly. The controller bus 244 may allow for sharing of data and instructions, as well as the coordination of processing operations.

Any number of controller buses 244 may be provided. A controller bus 244 may be segmented to any suitable degree. For example, a first controller bus 244 may be a full-height bus that connects all SIMD controllers 108, a second controller bus 244 may be segmented into two half-height busses that divide the SIMD controllers 108 into two groups, and third and fourth controller buses 244 may be broken into four segments each. As such, different groups of SIMD controllers 108 may be defined to coordinate operations. A given SIMD controller 108 may subscribe to any connected controller bus 244.

When SIMD controllers 108 are to operate in a master/slave scheme, a SIMD controller 108 operating as a slave may do nothing but relay sequences from its master/slave controller bus 244 to its connected computational memory bank 100. Index registers, loop counters, stack and instruction memory a SIMD controller 108 operating as a slave may be inactive.

Further, in this embodiment, a plurality of general-purpose row busses 246, 248 are provided to connect processing elements 116 and SIMD controllers 108 in each bank 100. The row busses 246, 248 may include a main row bus 246 that is unidirectional from the SIMD controller 108 to all processing elements 116 in the bank 100, and a segmented row bus 248 for local bidirectional communications among groups of processing elements 116 in the bank 100. The main row bus 246 connects the SIMD controller 108 to the processing element 116 of each bank 100 to distribute opcodes and data. The segmented row bus 248 provide for local manipulations such as permutations and pipelined inter-processing element transfer of information.

As should be apparent from the above, the controller bus 244 provides for flexibility in operational configurations of the computational memory banks 100. Further, the input/output circuit 242 allows for a SIMD controller 108 to manage and coordinate operations of the device 240.

Figure 6:
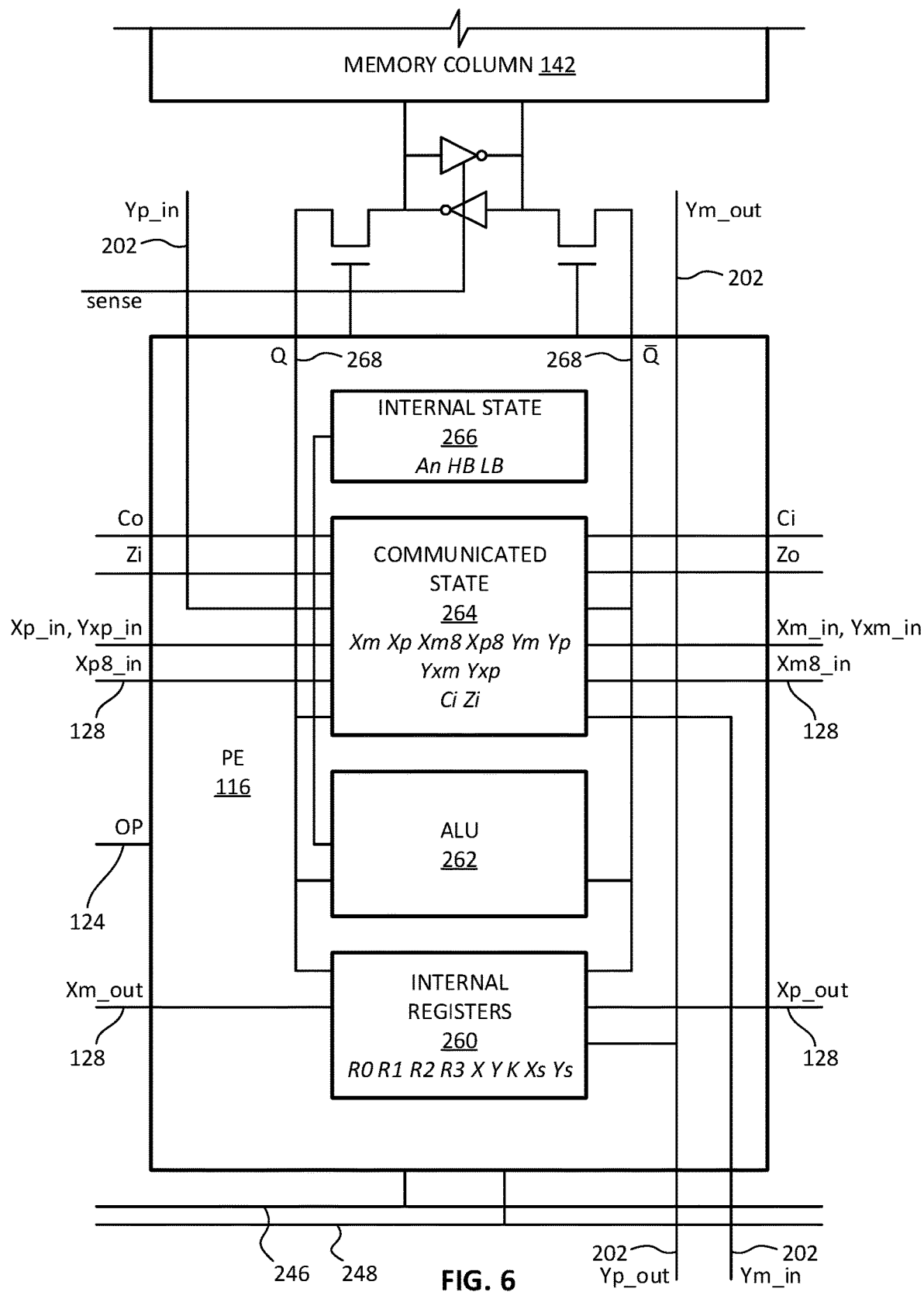
FIG. 6 is a block diagram of a processing element, according to the present invention.

FIG. 6 shows an embodiment of a processing element 116 that may be used in a computational memory bank, such as the bank 100.

The processing element 116 includes internal registers 260, an arithmetic logic unit (ALU) 262, communicated state 264, and internal state 266. The internal registers 260 and communicated state 264 are connected to a column of memory 142 via an internal bus 268, which may be a differential bus. The internal registers 260 may be implemented as contacted 6T memory cells, in that state of a register can be read directly by external circuitry in addition to standard outputs onto a bit line or lines.

The internal bus 268 may be written to and read from by the memory column 142, the internal registers 260, the ALU 262, and the communicated state 264.

The internal registers 260 may include a plurality of general-purpose registers (e.g., R0, R1, R2, R3), a plurality of static registers (e.g., X, Y), a plurality of communications registers that are accessible to adjacent processing elements 116 (e.g., Xs, Ys), and a mask bit (e.g., K). The internal registers 260 may be connected to the internal bus 268 to be written, to write other registers, and to communicate information with the ALU 262. The SIMD controller 108 may control which internal registers 260 are to be written and read and whether the mask bit K is to be overridden.

The internal registers 260 may be configured for arithmetic, such as sums and differences, with the ALU 262. Generally, the internal registers 260 may be used to compute any function.

The static registers X, Y may be configured to provide information to adjacent processing elements 116 in the same or different bank via the communications registers Xs and Ys that are associated with the static registers X and Y and that copy the values of the static registers X and Y (i.e., Xs, Ys are slaved to X, Y). The communicated state 264 of connected processing elements 116 takes values from the local communications registers Xs, Ys. As such, the ALU 262 may be configured to pass data, e.g., perform shifts, among connected processing elements 116 in a synchronous or pipelined manner. The SIMD controller 108 may provide a strobe specific to the communications registers Xs, Ys, so that the strobe may be skipped and its power saved. The mask bit K in a processing element 116 protects static registers X and Y in the same processing element 116 and not the communications registers Xs and Ys.

In this example, communications registers Xs, Ys may be read by adjacent processing elements 116 in the same bank and communications register Ys may be read by processing elements 116 in the same column in adjacent banks. That is, registers Xs, Ys can communicate information in the row direction by, for example, a row connection 128, and register Ys can communicate information in the column direction by, for example, a column connection 202. Other examples are also contemplated, such as limiting register Ys to column communications with only register Xs being used for row communications.

The communications registers Xs, Ys may be implemented as slave latch stages, so that their values may be used by other processing elements 116 without producing a race condition.

The mask bit K may be configured to disable all write operations (e.g., to memory column 142, registers 260, and/or row buses 246, 248) unless overridden by the connected SIMD controller 108. The mask bit K may be configured to disable writeback when high. This may include the mask bit K disabling itself, so unless the mask bit K is overridden successive writes to the mask bit K will disable an increasing number of processing elements 116 in the linear array. This has the implementation advantage that the mask bit K may be built exactly like the other bits, and the programming advantage that the mask bit K implements nested conditional statements (i.e., "if" statements) without added complexity.

The ALU 262 may include multiple levels of multiplexers (e.g., two levels). The ALU 262 may be configured to select input from the internal registers 260, the communicated state 264, and the internal state 266 and allow arbitrary functions on such input to be computed. A function may be defined by information communicated via a bus 246, 248.

The communicated state 264 includes information based on communications registers (e.g., Xs, Ys) of other processing elements 116. The communicated state 264 may be used for shifts and similar operations.

The communicated state 264 may include X-adjacent state Xm, Xp from communications registers Xs of adjacent processing elements 116 in the same bank 100. Communicated state Xm may be the value of the register Xs of the adjacent processing element 116 having the lower address (i.e., "m" signifies minus). Communicated state Xp may be the value of the register Xs of the adjacent processing element 116 having the higher address (i.e., "p" signifies plus). The X-adjacent state Xm, Xp at each end of the linear array of processing elements 116 may be set to specific values, such as 0. In other embodiments, the X-adjacent state Xm, Xp at each end of the linear array of processing elements 116 may be wired to a take its value from the communications register Xs at the opposite end, such that values may "roll".

To facilitate greater capacity for row-based communications within a bank 100, the communicated state 264 may include further X-adjacent state Yxm, Yxp from communications registers Ys of adjacent processing elements 116 in the same bank 100. Communicated state Yxm may be the value of the register Ys of the adjacent processing element 116 having the lower address. Communicated state Yxp may be the value of the register Ys of the adjacent processing element 116 having the higher address. The further X-adjacent state Yxm, Yxp at each end of the linear array of processing elements 116 may be set to specific values, such as 0. In other embodiments, the further X-adjacent state Yxm, Yxp at each end of the linear array of processing elements 116 may be wired to take its value from the communications register Ys at the opposite end, such that values may "roll".

The communicated state 264 may include X-distant state Xm8, Xp8 from communications registers Xs of processing elements 116 in the same bank 100 a fixed address distance away, such as eight bits. Communicated state Xm8 may be the value of the register Xs of the processing element 116 having an address eight lower. Communicated state Xp8 may be the value of the register Xs of the adjacent processing element 116 having an address eight higher. The X-distant state Xm8, Xp8 near each end of the linear array of processing elements 116 may be set to specific values, such as 0. In other embodiments, the X-distant state Xm8, Xp8 near each end of the linear array of processing elements 116 may be wired to take values from a corresponding communications register Xs near the opposite end, such that values may "roll" by the fixed address distance.

The communicated state 264 may include Y-adjacent state Ym, Yp from communications registers Ys of processing elements 116 in the same column in adjacent banks 100. Communicated state Ym may be the value of the register Ys of the corresponding processing element 116 in the adjacent bank 100 having the lower address. Communicated state Yp may be the value of the register Ys of the corresponding processing element 116 in the adjacent bank 100 having the higher address. Fixed end values or rolling may be implemented, as discussed above.

The SIMD controller 108 may be configured to access the X-distant state Xp8, Xm8 and the registers Xs, Ys of the end-most processing elements 116 in the linear array of processing elements, such that static register X, Y values of the end-most and neighboring processing elements 116 may be read.

The communicated state 264 may further include a carry input Ci and another input Zi, which may represent sign extension.

The carry input Ci may ripple asynchronously from a carry output Co of an adjacent processing element 116. The carry input Ci of an end-most column may be provided by the SIMD controller 108. If the bank 100 is divided into two halves, the carry input Ci of an end-most column of each half of the bank 100 may be provided by the SIMD controller 108. The carry input Ci is contemplated to be monotonic decreasing with time.

The sign extension input Zi may ripple asynchronously from the sum Z of the adjacent processing element 116 in the direction opposite carry ripple. The sign extension input Zi of an end-most column, opposite the end-most column of carry input Ci, may be provided by the SIMD controller 108. If the bank 100 is divided into two halves, the sign extension input Zi of an end-most column of each half of the bank 100 may be provided by the SIMD controller 108. The sign extension input Zi is contemplated to be monotonic decreasing with time. The input Zi may also be used to ripple an arbitrary function.

The SIMD controller 108 may be configured to read carry output Co from one end of the linear array of processing elements 116 and to read output Zo (e.g., sign extension output) at the opposite end of the linear array of processing elements 116.

The communicated state 264 for a given processing element may be implemented as endpoints of direct connections 128 with other processing elements 116.

The internal state 266 may include address bits An, a high bit HB, and a low bit LB. The address bits An, high bit HB, low bit LB may be used to situate a processing element 116 in context with the plurality of processing elements 116 in the linear array of processing elements 116.

The address bits An are hardcoded so that each processing element 116 is uniquely addressable within the bank 100. In the example of 4096 processing elements per bank, 12 address bits (A0-A11) may be used. In other embodiments, the address bits An may be stored in registers and configurable by the SIMD controller 108.

The SIMD controller 108 may select a precision level for the bank 100 and the high bit HB and low bit LB may be derived from the selected precision level. Precision level selection may identify to the processing element 116 which address bit An is to be referenced to compute the high bit HB and low bit LB.

The SIMD controller 108 may make a precision level selection by communicating a precision signal to all of the processing elements 116 in the bank 100. The precision signal may indicate which address bit An is to be the precision-indicating address bit An for the bank 100. The precision signal may be a one-hot signal on a number of lines equal to the number of address bits An or may be an encoded signal, such as a 4-bit signal, that uniquely identifies one address bit An.

The high bit HB and low bit LB may delimit groups of processing elements 116 for multibit arithmetic. Such groups may be fixed and power of 2 in size.

The low bit LB defines the lowest bit in a group. The low bit LB is set (e.g., to 1) in a particular processing element 116 when the precision-indicating address bit An of the processing element 116 is not set (e.g., 0) and the precision-indicating address bit An of the next processing element 116 in the low-bit direction is set (e.g., 1).

The high bit HB defines the highest bit in a group. The high bit HB is set (e.g., to 1) in a particular processing element 116 when the precision-indicating address bit An of the processing element 116 is set (e.g., 1) and the precision-indicating address bit An of the next processing element 116 in the high-bit direction is not set (e.g., 0).

Only one of high bit HB and low bit LB needs to be computed. If a processing element 116 has its high bit HB set, then the low bit LB of the next processing element 116 can be set. Conversely, if a processing element 116 does not have its high bit HB set, then the low bit LB of the next processing element 116 should not be set.

The techniques for setting addresses and for setting precision, via high bit HB and low bit LB, are adaptable to both big- and little-endian conventions.

The high bit HB and low bit LB may be used to limit propagation of carry input Ci and sign extension input Zi, such that the operating precision of the bank 100, is respected.

Figure 7A:
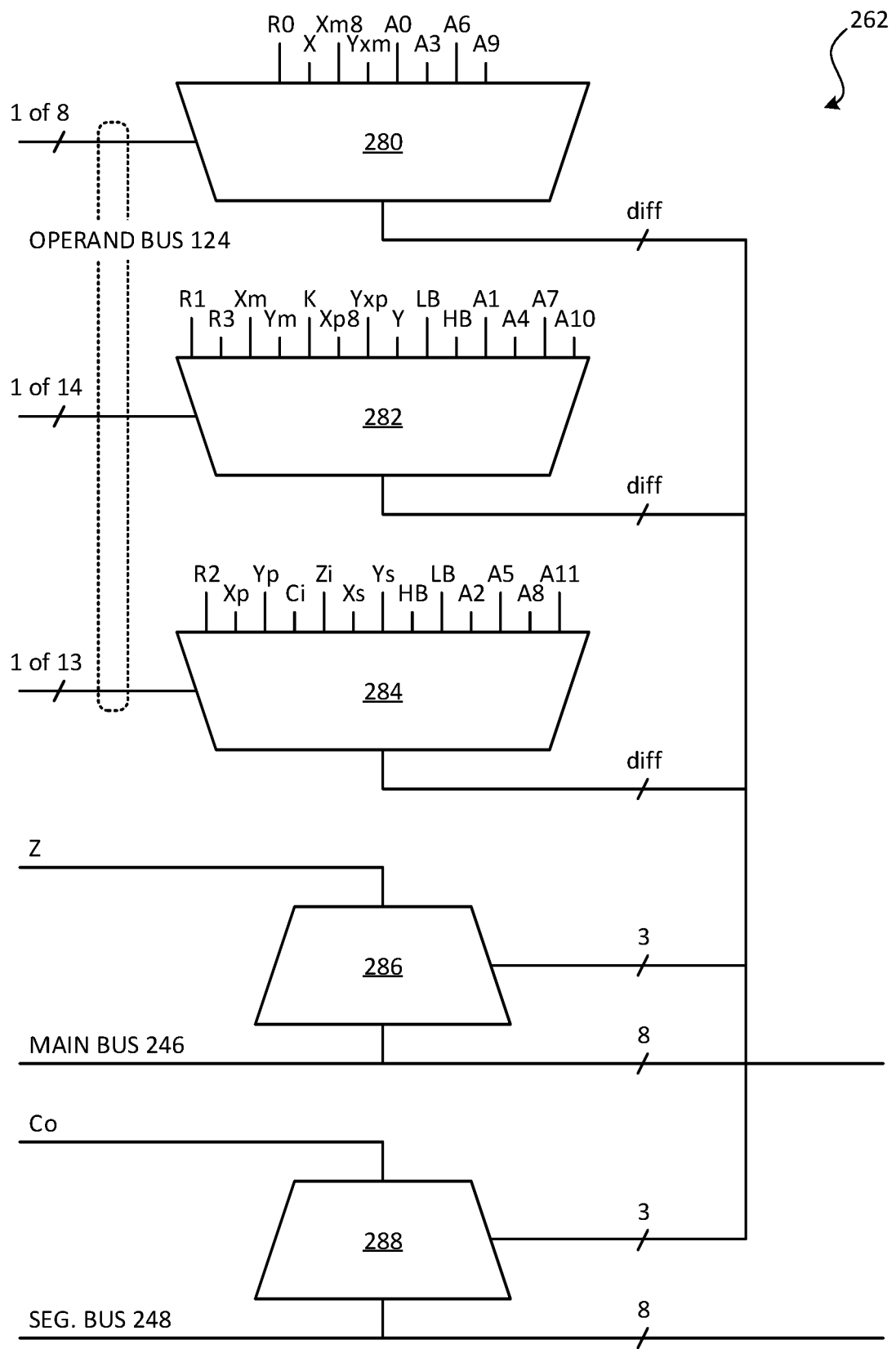
FIG. 7A is a block diagram of an arithmetic logic unit of a processing element, according to the present invention.

As shown in FIG. 7A, the ALU 262 may include two levels of multiplexers. A first level may include multiplexers 280, 282, 284 and a second level may include multiplexers 286, 288. The multiplexers may be implemented in dynamic logic for space and energy efficiency. Clocks may be provided by the SIMD controller 108 to gate the multiplexers.

The first-level multiplexers 280, 282, 284 may be configured to provide select bits (e.g., three select bits) for the second level multiplexers 286, 288 based on input from the operand bus 124. The first-level multiplexers 280, 282, 284 may be configured for one-hot input, such that one of the inputs is selected. The inputs to the first-level multiplexers 280, 282, 284 may include any of various bits available at the processing element 116, such as the internal registers 260, the communicated state 264, and the internal state 266. The outputs to the second-level multiplexers 286, 288 may include differential signals. Parallel N-type metal-oxide-semiconductor logic (NMOS) devices may be used to implement the first-level multiplexers 280, 282, 284.

Internal registers 260, communicated state 264, and internal state 266 may be provided as inputs to allow an arbitrary function to be performed. For example, registers X, Y, and R1-R4 and communicated state Xp, Yp, Xm, Ym, Xp8, Xm8, Yxp, and Yxm may be used for arithmetic, shifts, and so on, address bits A0-A11 may be used for assignment of specific values to specific processing elements, for flipping of multi-bit values, and so on. There are no specific limitations on the arbitrary functions that may be performed.

The second-level multiplexers 286, 288 may include a main-bus multiplexer 286 and a segmented-bus multiplexer 288. The main bus multiplexer 286 may be configured to receive input, such as a truth table from the SIMD controller 108, via the main row bus 246, which may be 8 bits. The segmented-bus multiplexer 288 may be configured to receive input, such as a truth table from the SIMD controller 108, via the segmented row bus 246, which may be 8 bits. The second-level multiplexers 286, 288 compute an arbitrary function that may be defined through the busses 246, 248. Such a function may operate on the operands (e.g., 3 bits) selected by the first-level multiplexers 280, 282, 284 and provided to the second-level multiplexers 286, 288 as selection input. Trees of NMOS switches driven by the differential signals from the first-level multiplexers 280, 282, 284 may be used to implement the second-level multiplexers 286, 288.

State information of the processing element 116 that contains the ALU 262 is provided to the first-level multiplexers 280, 282, 284 whose control inputs are provided by the associated SIMD controller 108 via the operand bus 124 to all processing elements 116 of the bank 100. As such, an operation may be performed across all processing elements 116 based using operands selected by the SIMD controller 108, via the operand bus 124, and such operation may be based on an operation or other information shared throughout the bank 100 via the main row bus 246 and/or an operation or other information locally shared on the segmented row bus 246.

The ALU 262 may be used to write to a bus 204, 246, 248. The bus line to write to may be selected by the output of the first-level multiplexers 280, 282, 284, i.e., 3-bit output to select one of eight lines.

Figure 7B:
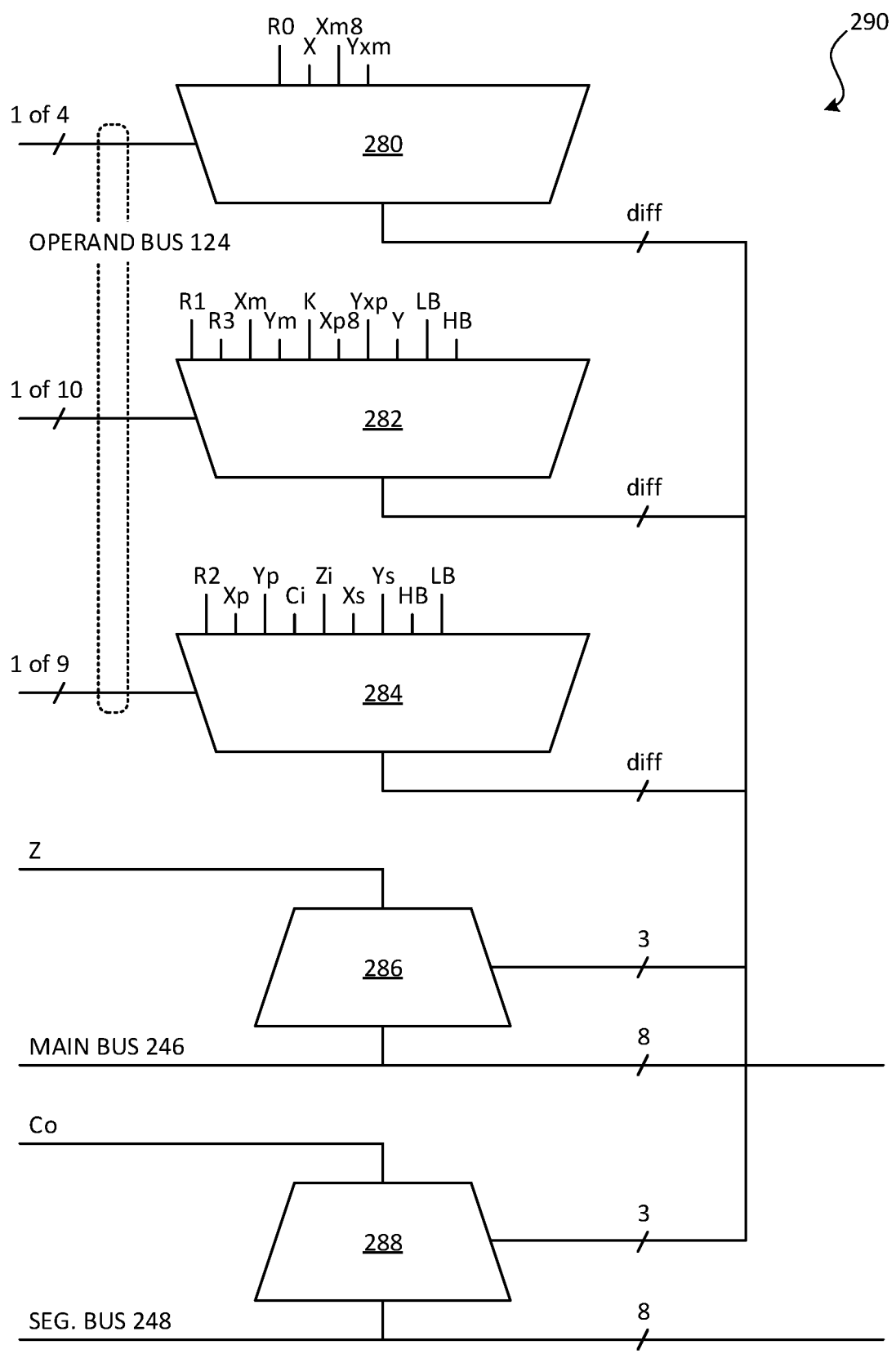
FIG. 7B is a block diagram of another arithmetic logic unit of a processing element, according to the present invention.

FIG. 7B shows an ALU 290 according to another embodiment. The ALU 290 may be similar to the ALU 262, except that fixed address bits A0-A11 are not provided as input to the first-level multiplexers 280, 282, 284. The ALU 290 is a simpler ALU that does not allow for functions related to the address of the processing element 116. Numerous other ALUs are contemplated as taking a subset of inputs shown for the ALU 262.

Figure 7C:
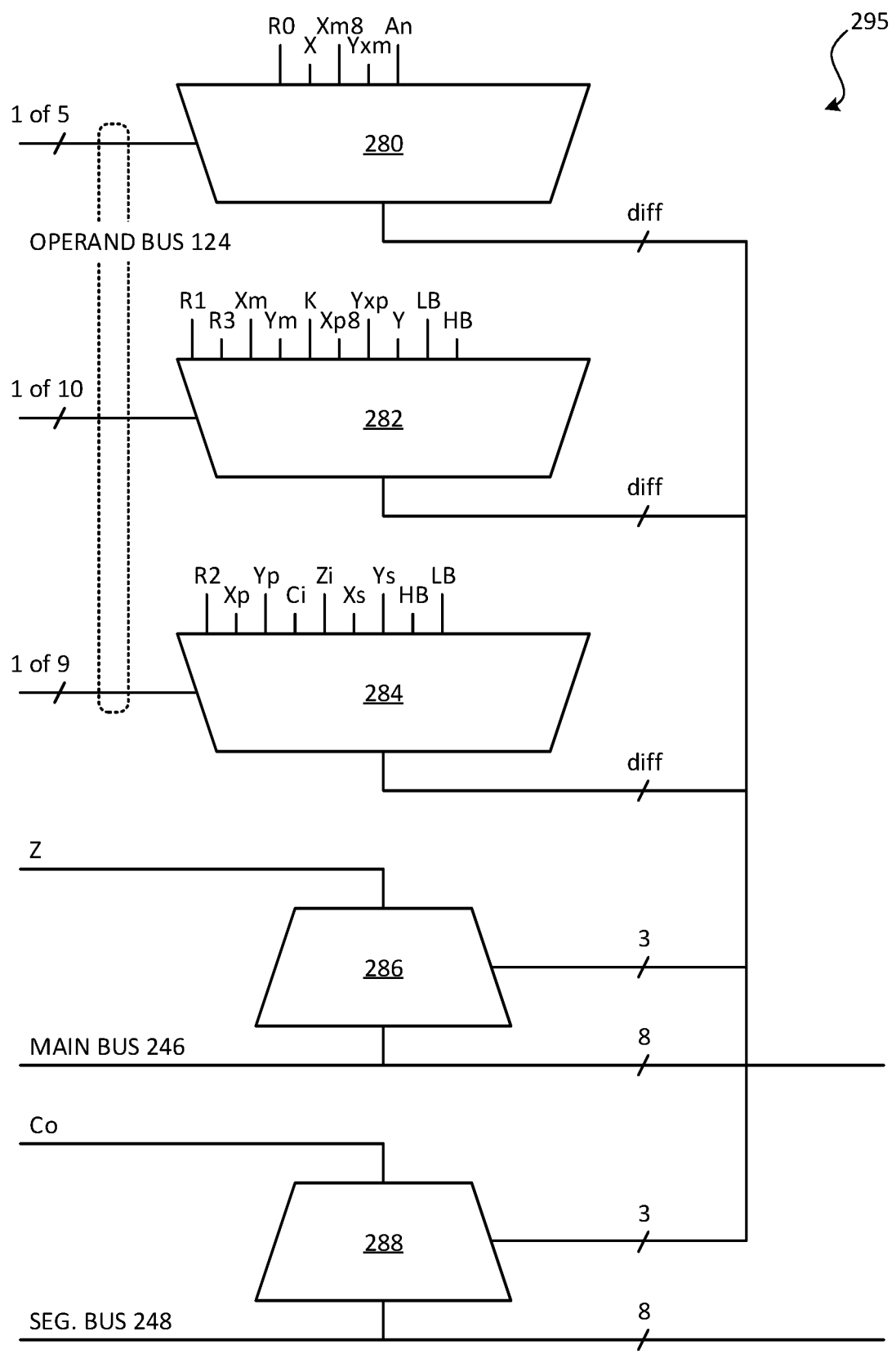
FIG. 7C is a block diagram of another arithmetic logic unit of a processing element, according to the present invention.

FIG. 7C shows an ALU 295 according to another embodiment. The ALU 295 may be similar to the ALU 262, except that a selectable address bit An is provided as input to a first-level multiplexer 280 instead of providing fixed address bits A0-A11. As such, the ALU 295 may access a selected address bit for its computations.

FIG. 8 shows a table of an example arithmetic operation for the ALU 262. Truth tables for a carry output Co and a sum Z are shown. The example operation is addition and other operations are readily implemented.

The first-level multiplexers 280, 282, 284 may provide operand values, such as values of registers R0 and R1, and carry input Ci to the second-level multiplexers 286, 288, which may respectively receive the sum Z truth table, via the main row bus 246, and the carry output Co truth table, via the segmented row bus 248. Accordingly, the second-level multiplexers 286, 288 may compute the sum Z and carry out Co.

The carry output Co and sum Z truth tables may be considered the opcode for addition. In this example, the opcode for addition in hexadecimal is 0×2b 0×69. The opcode portion 0×2b is the carry output Co truth table (i.e., the bits 0010 1011 of the Co column read from bottom to top) and the opcode portion 0×69 is the sum Z truth table (i.e., the bits 0110 1001 of the Z column read from bottom to top). The carry output Co opcode portion 0×2b and the sum Z opcode portion 0×69 are provided to the segmented row bus 248 and the main row bus 246, respectively, to cause the second-level multiplexers 286, 288 to add the operands provided by the first-level multiplexers 280, 282, 284 and output sum Z and carry Co.

Carry may propagate as carry input Ci to carry output Co though a group of processing elements 116. Carry propagation may be delimited at a power-of-2 position selected by the SIMD controller 108, with such delimitation being available to the processing element 116 as high bit HB and low bit LB.

Figure 9:
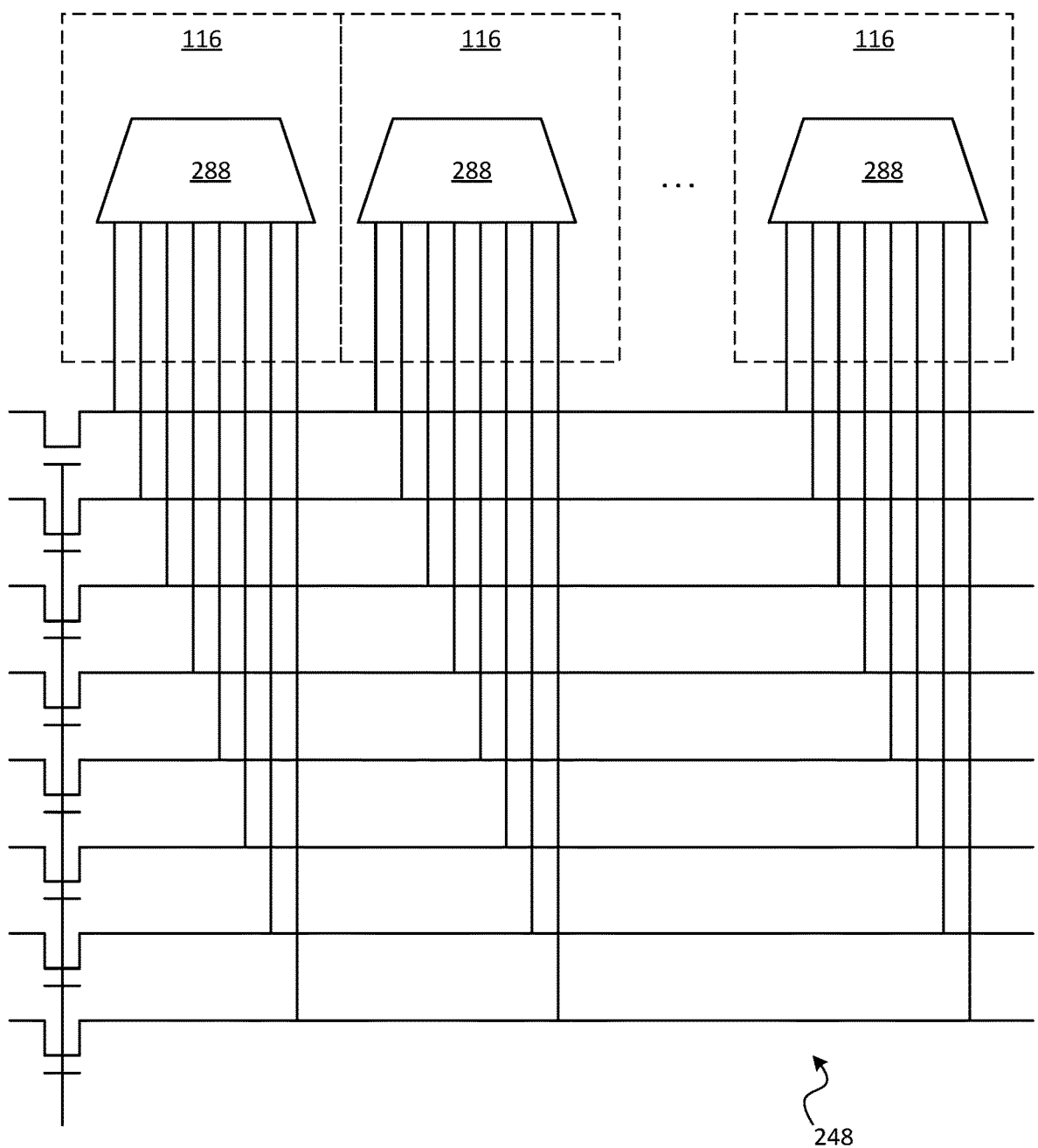
FIG. 9 is a diagram of a segmented bus of a computational memory bank, according to the present invention.

FIG. 9 shows an embodiment of a segmented bus 248. Each inputs of the segmented-bus multiplexer 288 of each processing element 116 may be connected to a respective line of the segmented bus 248. The segmented bus 248 may be preset high in each segment by the SIMD controller 108, then left to float so that any enabled segmented-bus multiplexer 288 can pull lines low, and then latched.

The SIMD controller 108 has access to the end-most segment and may be configured to read and write to the end-most segment. This may be useful in pumping data from the array of memory units 104 to the SIMD controller 108 to, for example, load controller code from main memory. Data specific to the processing elements 116 may similarly be distributed from the SIMD controller 108. A bank 100 that includes an input/output circuit 242 may use this mechanism for input/output.

The segmented bus 248 may also be used to perform table lookup, in which processing elements 116 set their own opcodes, because the segmented bus 248 can be written and read locally.

Figure 10:
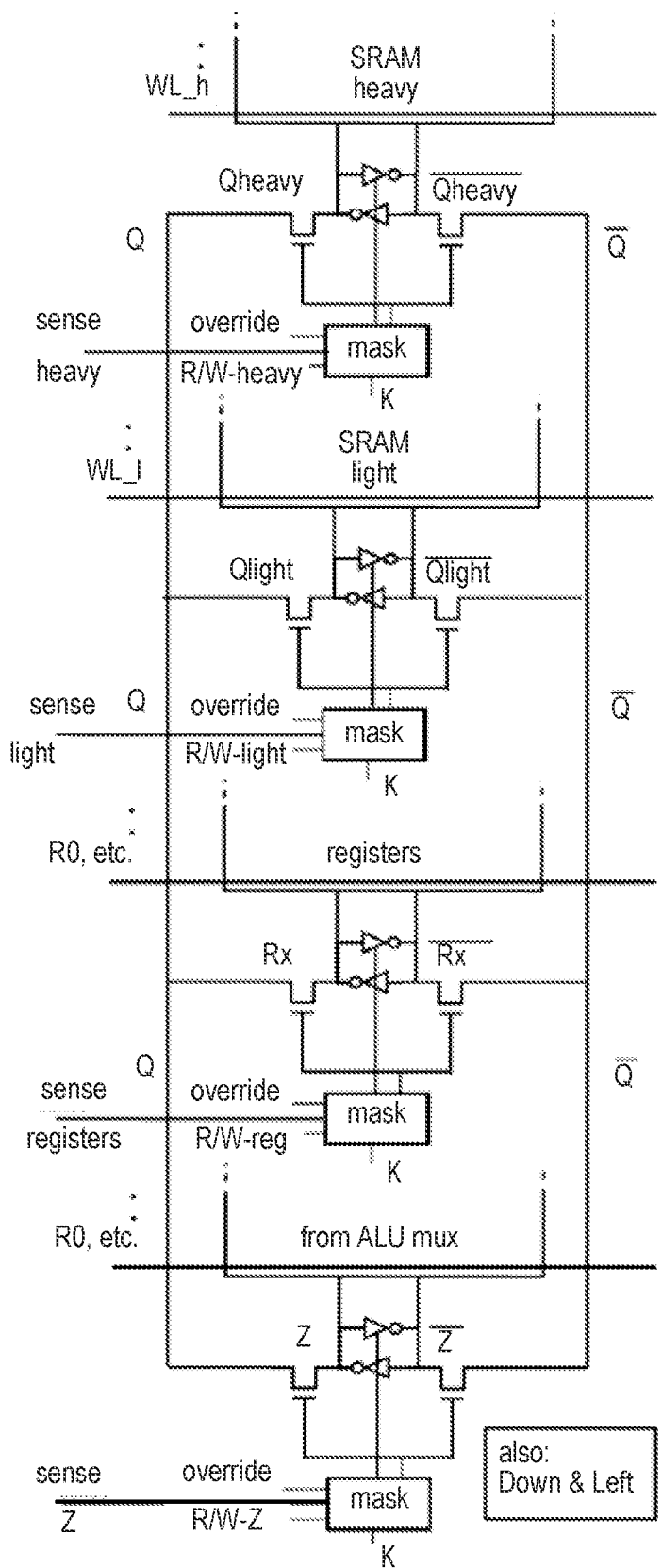
FIG. 10 is a diagram of an internal bus of a processing element, according to the present invention.

FIG. 10 shows an embodiment of an internal bus of a processing element 116 and example implementation detail of the processing element 116. The heavy and light memory cells and the internal registers may be implemented using a sense-amp structure, as shown.

FIGS. 11 to 14 show known processing elements that are adaptable for use in a computational memory bank 100 of the present invention. Although some structure/function of these processing elements is known, their adaptation into the computational memory bank 100 is considered part of the present invention.

Figure 11:
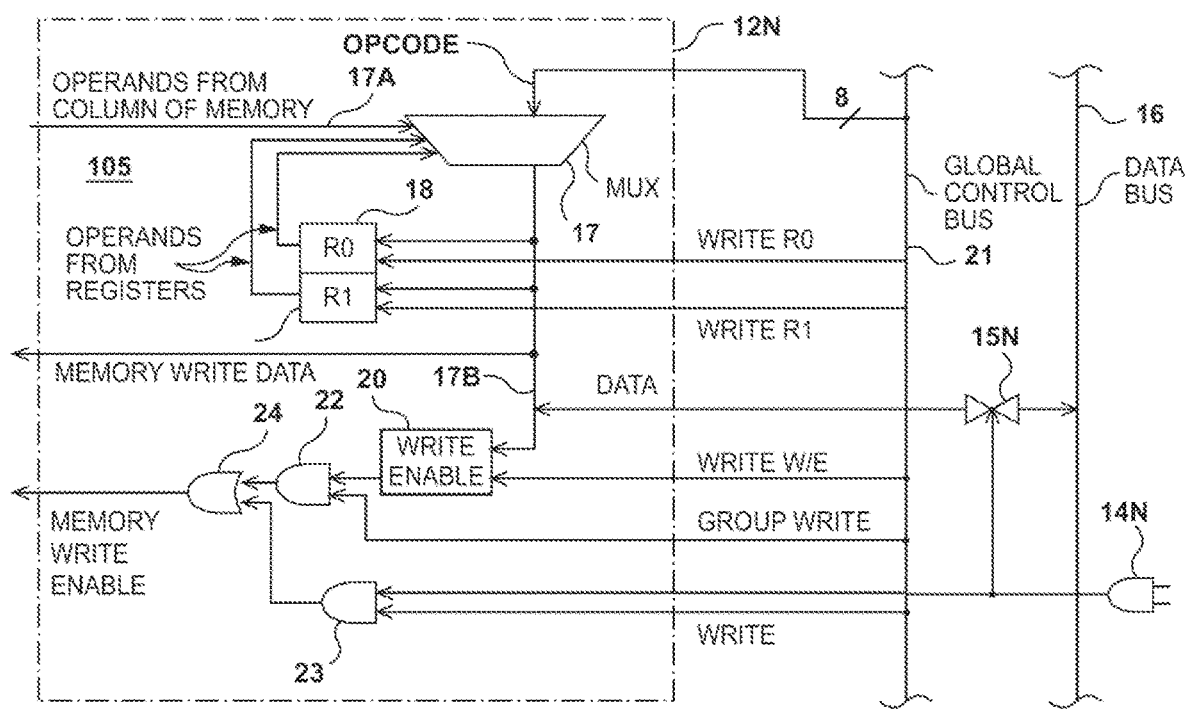
FIG. 11 is a diagram of a one-bit processing element adapted to general-purpose processing of one-bit values for use with the present invention.

FIG. 11 shows a prior art processing element 12N that may be used as a processing element 116 in a computational memory bank 100 of the present invention. The processing element 12N contains an ALU implemented as an 8:1 multiplexer 17. The output line of multiplexer 17 is connected to the data inputs of registers 18 (i.e., static register X) and 19 (i.e., static register Y) as well as to a write-enable register 20 and to a bit-write 17B that may be provided to a column 142 of an array of memory units 104. A bit-read output 17A may be provided to the column 142 together with data outputs of the registers 18 and 19 to address multiplexer 17 and thus to select which of eight opcode lines of its input from a global control bus 21 will be connected to its output. In this way, the multiplexer 17 serves to calculate an arbitrary function of the bit values at 17A, 18 and 19. Such an arbitrary function may be defined by a truth table represented by the eight-bit value on the global control bus 21. The global control bus 21 may be a row bus 132, as described elsewhere herein.

The write-enable register 20 may allow conditional execution. For example, by disabling writes in some processing elements 12N but not in other processing elements 12N, the same instructions may be executed in all processing elements 12N with writes being selectively enabled. Thus, a condition ("IF") that results in the execution of a "THEN" block or an "ELSE" block may be handled by enabling writes by computing write enable as the condition for all processing elements 12N, then executing the "THEN" block, then inverting write enable in all processing elements 12N, and then executing the "ELSE" block.

The global control bus 21, in addition to providing the eight-bit truth table for the ALU, may also provide clocking signals "Write X", "Write Y", "Write W/E" to cause ALU data to be clocked into registers 18, 19 and 20. The bus 21 may further provide control signals "Group Write" and "Write" which allow external input data to write to memory without use of the ALU. This external input data can be driven onto line 17B through switch 15N from, for example, a 16-bit data bus 16. The data bus 16 may also be used to load registers 18 and 19 through this path.

Figure 12:
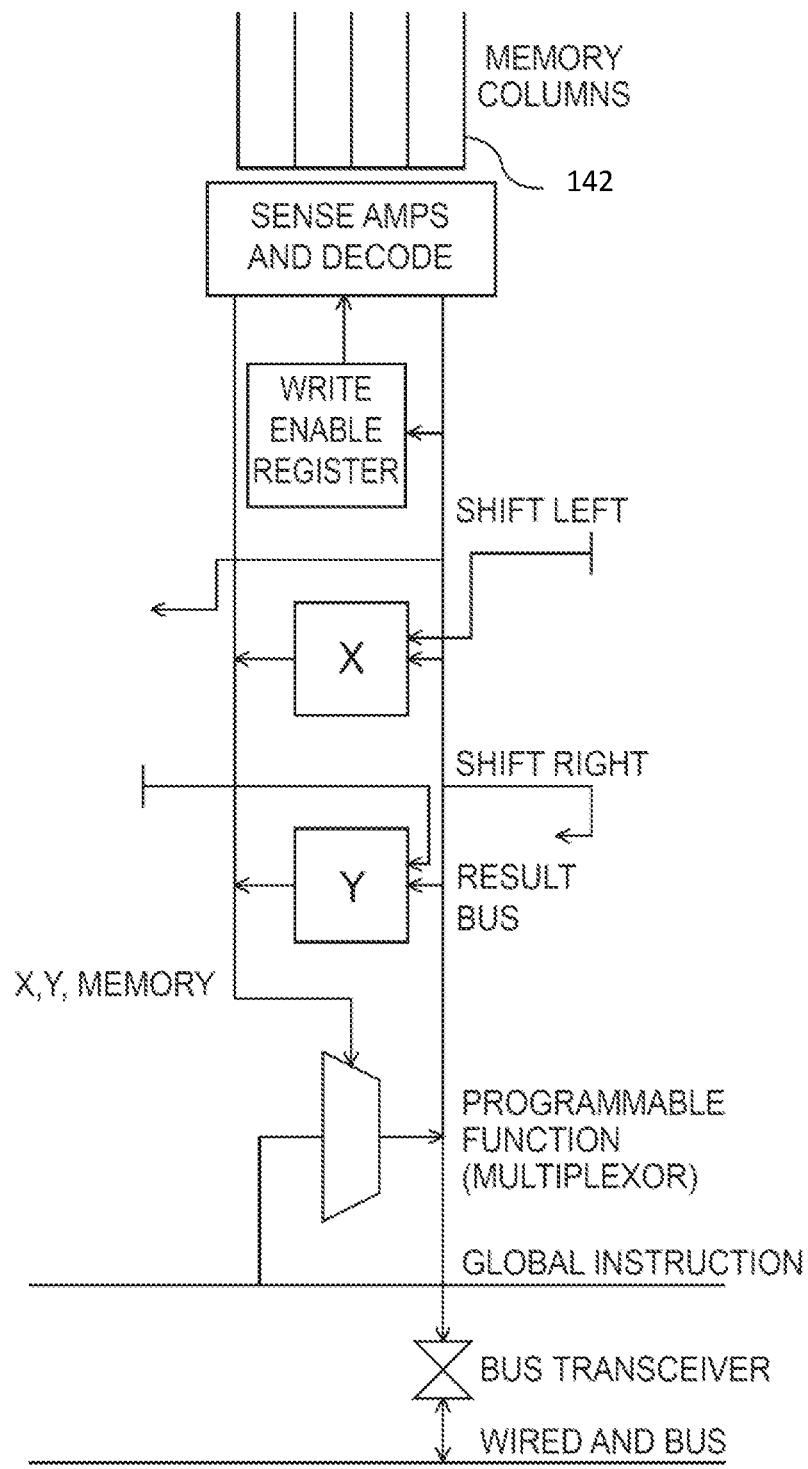
FIG. 12 is a diagram of a one-bit processing element having nearest-neighbor communications in the row direction for use with the present invention.

FIG. 12 shows a prior art one-bit processing element by Elliott having nearest-neighbor communications in a row direction. This processing element may be adapted to be a processing element 116 in a computational memory bank 100 of the present invention. This processing element adds secondary inputs and outputs to the X and Y registers, allowing each X register to be loaded from the output of the ALU to its right ("shift left") or each Y register to be loaded from the ALU to its left ("shift right") or both.

Figure 13:
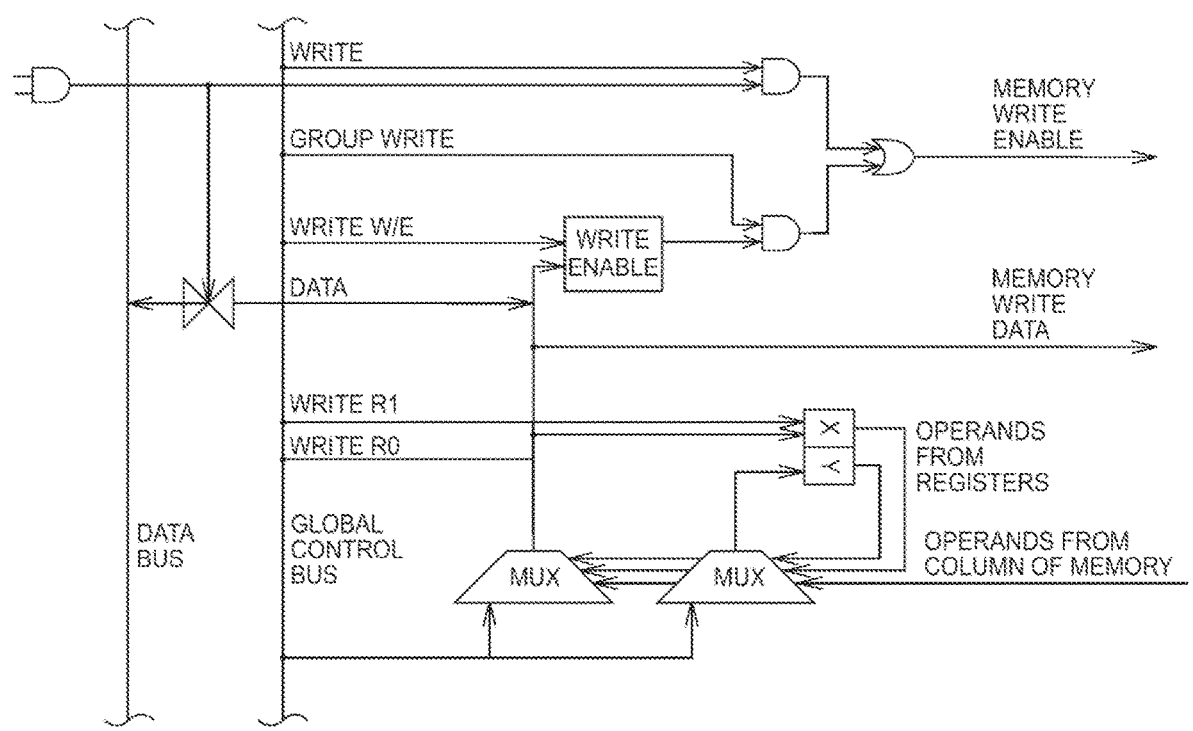
FIG. 13 is a diagram of a one-bit processing element performing two operations per memory read for use with the present invention.

FIG. 13 shows a prior art one-bit processing element from U.S. Pat. No. 5,546,343 capable of performing two operations per memory read. This processing element may be adapted to be a processing element 116 in a computational memory bank 100 of the present invention. A global control bus may be doubled to a 16-bit width, so that it may carry two 8-bit truth tables. Multiplexers 17C and 17D simultaneously compute the two functions of three local state bits X, Y and memory. Values for X and Y may be computed simultaneously.

Figure 14:
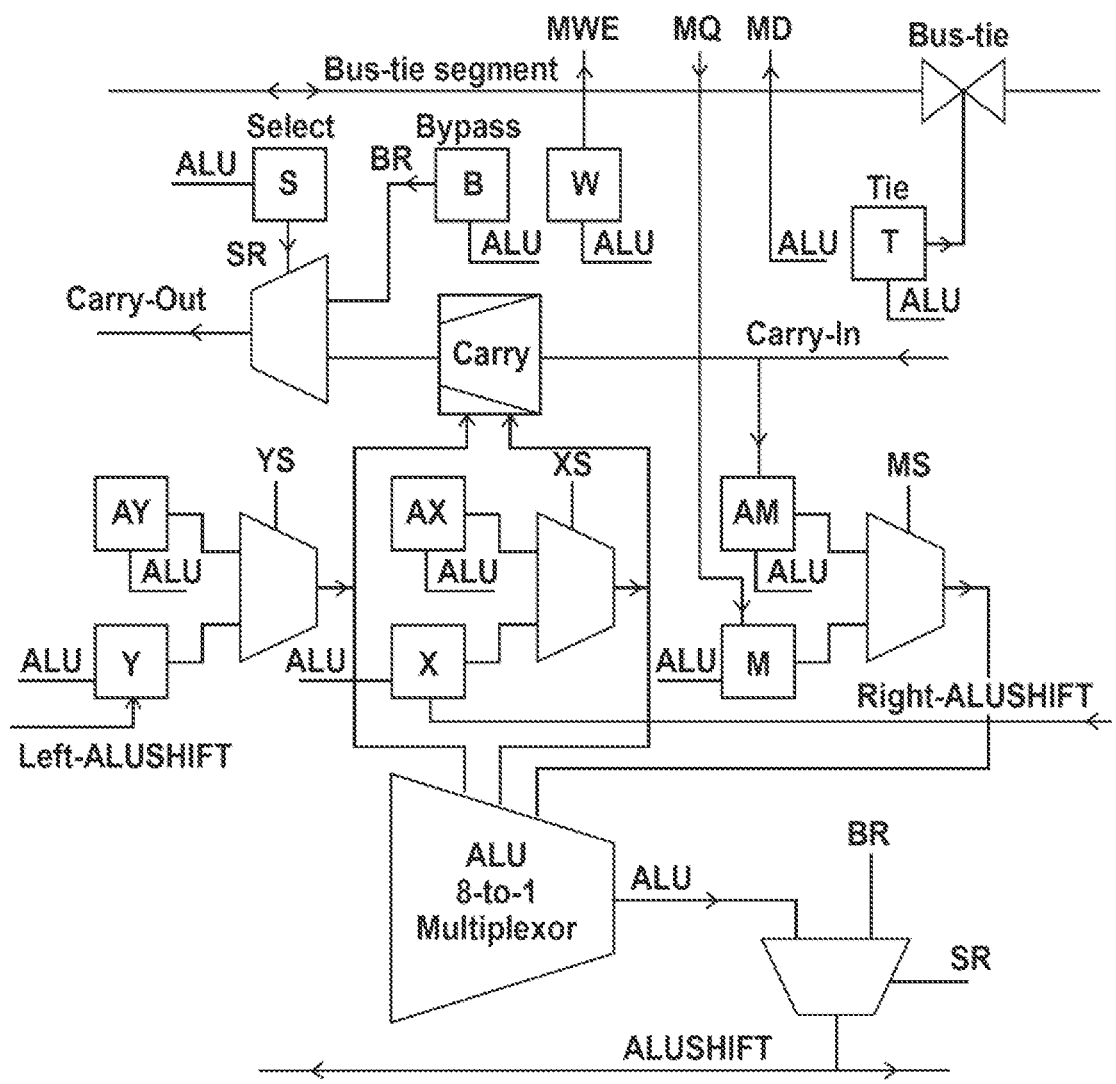
FIG. 14 is a diagram of a multi-bit processing element with a carry generator enhancement for arithmetic and with reduced use of memory for use with the present invention.

FIG. 14 shows a prior art multi-bit processing element by Cojocaru. The processing element includes a carry generator enhancement for arithmetic and with reduced use of memory. This processing element may be adapted to be a processing element 116 in a computational memory bank 100 of the present invention. One notable feature is that the X and Y registers have been generalized to become register banks, in this case with two registers (e.g., X and AX) in each, and the memory has been treated similarly as a type of register bank in which one register ("M") is replaced by a bit read from memory. Read-only bits may also be treated as registers in a register bank. For low-power applications it may be desirable to cache data in low-power registers rather than repeatedly referring to the higher-power memory. Note that the left-right nearest-neighbor communication described elsewhere herein available for this structure.

A further enhancement here is the addition of the "Carry" block, having an input "Carry-in" from an adjacent processing element, which can be combined with data from X and Y register banks, and which generates a "Carry Out" which may optionally be passed to the next processing element in the opposite direction. Registers S and B may be used to suppress carry propagation ("S") and to replace it with a given bit "B". If, for example, register S is set to suppress carry propagation in every forth processing element and is to replace carry with a "0", the effect is to create a system with N/4 4-bit processing elements from a computational memory bank 100 having N single-bit processing elements. A path to store Carry-Out in the local processing element may be added if it is desired to perform 8-bit calculations four bits at a time in groups of four processing elements.

FIG. 14 also shows a prior art segmented bus, in which register T may be used to enable or disable a switch connecting adjacent bus segments labelled "Bus-tie segment". This allows a single bus to be cut into an arbitrary number of smaller local buses.

Figure 15:
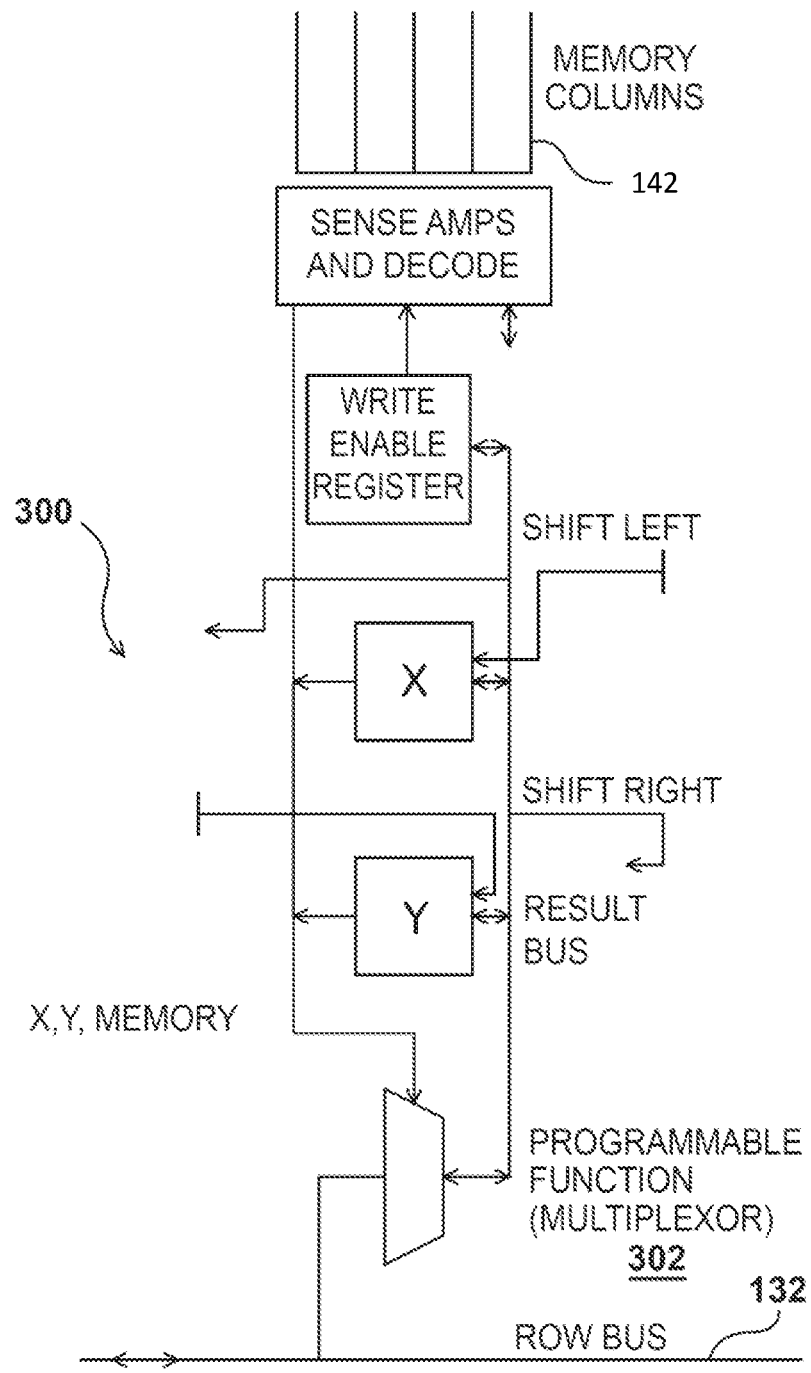
FIG. 15 is a diagram of a processing element according to the present invention in which an opcode multiplexer is enhanced to serve as a row bus.

FIG. 15 shows a processing element 300 according to the present invention. The processing element 300 may be used as a processing element 116 in a computational memory bank 100 of the present invention. The processing element 300 is similar to other devices described herein and redundant description is omitted for sake of clarity. The related description of other embodiments may be referenced, with like reference numerals denoting like components.

The processing element 300 includes an opcode multiplexer 302 that is configured to serve as a row-direction bus. The multiplexer 302 is used for bidirectional communications. Since area-efficient multiplexers can be implemented with a tree of switches, this need not add complexity. The X and Y registers (R0 and R1) are provided and are also bidirectional on the ports connected to the multiplexed side of the multiplexer 302. Tri-state and sense-amplifier styles of register may be used for the X and Y registers. In various other embodiments of the present invention, the bidirectional multiplexer 302 is combined with other features described herein, such as register banks, dual-operand or carry-enhanced processing elements, carry suppression, and so forth.

Making the multiplexer 302 bidirectional allows the row bus 132 to be eliminated, if space is at a premium, or supplemented if communications bandwidth is to be increased.

Figure 16:
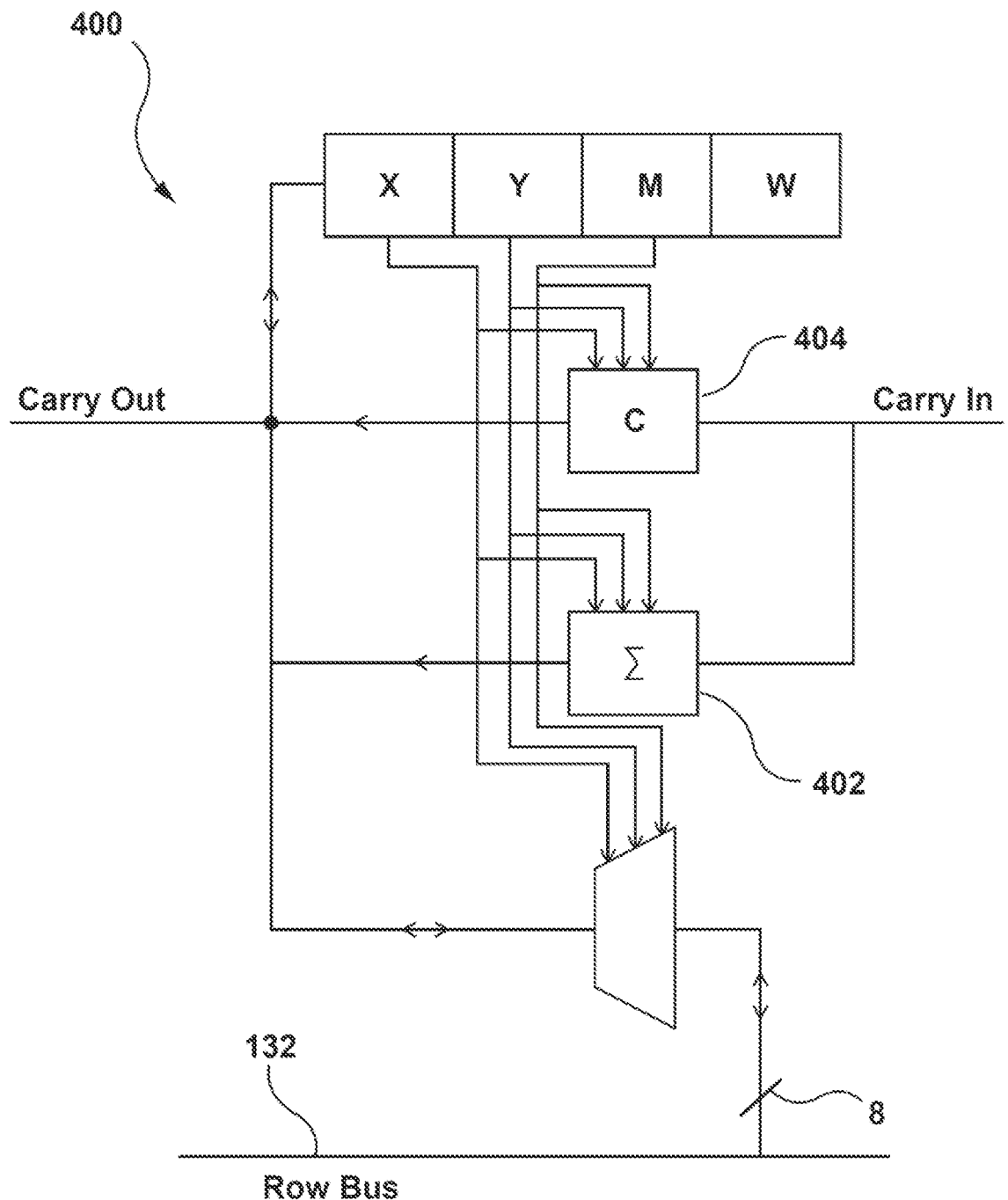
FIG. 16 is a diagram of a processing element according to the present invention having specialized sum and carry operations, allowing the row bus to be simultaneously used for communications.

FIG. 16 shows a processing element 400 according to the present invention having specialized sum and carry operations, allowing the row-direction bus to be simultaneously used for communications. The processing element 400 may be used as a processing element 116 in a computational memory bank 100 of the present invention. The processing element 400 is similar to other devices described herein and redundant description is omitted for sake of clarity. The related description of other embodiments may be referenced, with like reference numerals denoting like components.

A Σ (sigma) block 402 is operable to compute the sum bit of its three inputs X, Y and M. A carry block 404 is operable to simultaneously compute the carry bit. Both the sum and carry may be written back to any combination of X, Y, M (memory) and W (write-enable) registers, which may be implemented as memory banks. At the same time, the row bus 132 may be read into X, Y, M or W or a single row bus line chosen by the triple X, Y, M may be driven from X, Y, M or W. Any of the registers can be implemented as register buses. Further, the arithmetic blocks may be driven and the multiplexer may be addressed by different registers from these register files. In addition, latching of the multiplexer address or arithmetic inputs can be provided. A row-bus bit can be addressed independently of arithmetic operations.

Figure 17:
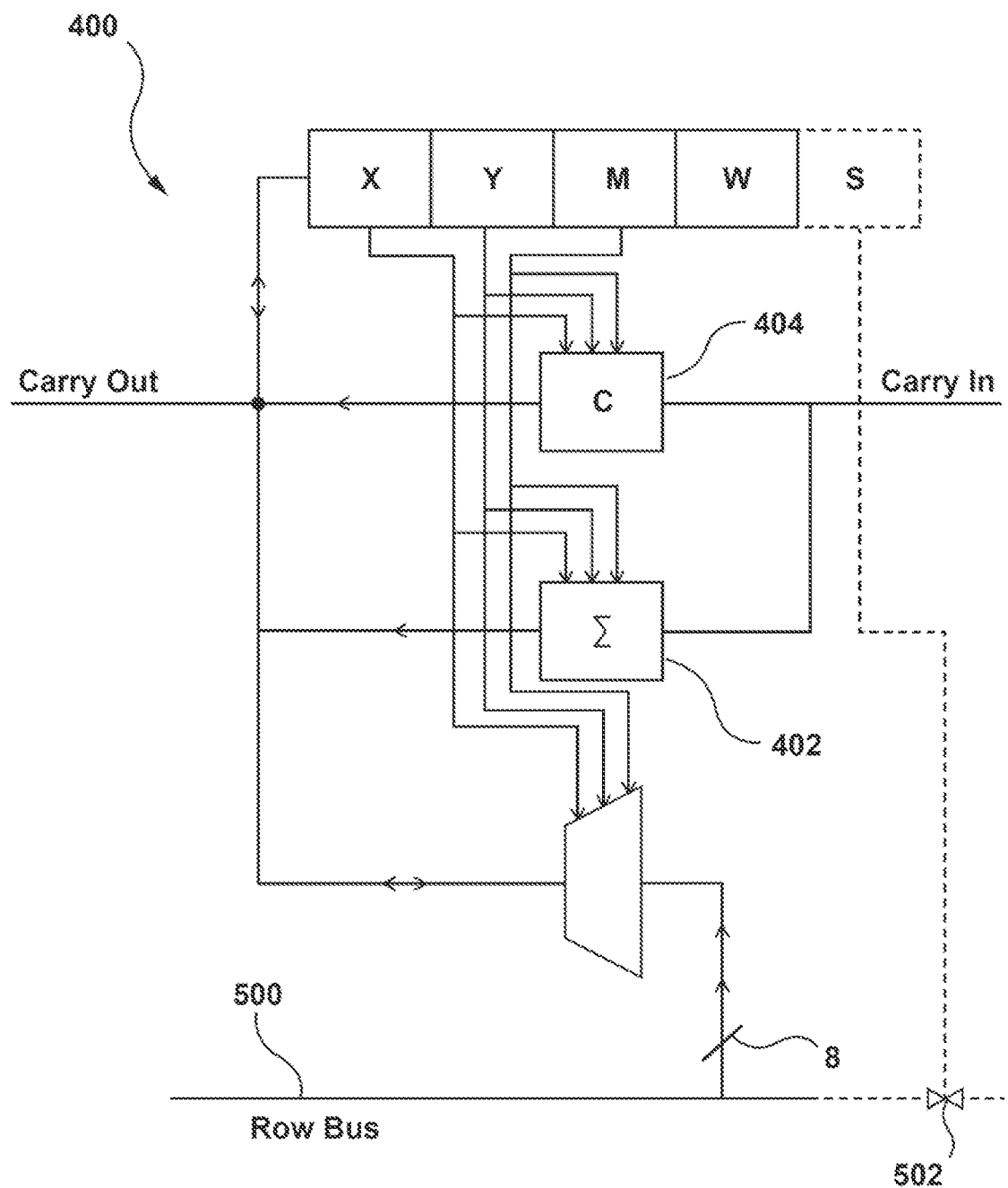
FIG. 17 is a diagram of a processing element with a row bus having segmentation switches, according to the present invention.

FIG. 17 shows the processing element 400 with a row bus 500 having segmentation switches 502. In some embodiments, the switches 502 are controlled by registers in associated processing elements 400. In other embodiments, the switches 502 are controlled directly by a SIMD controller 108 of the computational memory bank 100.

Figure 18:
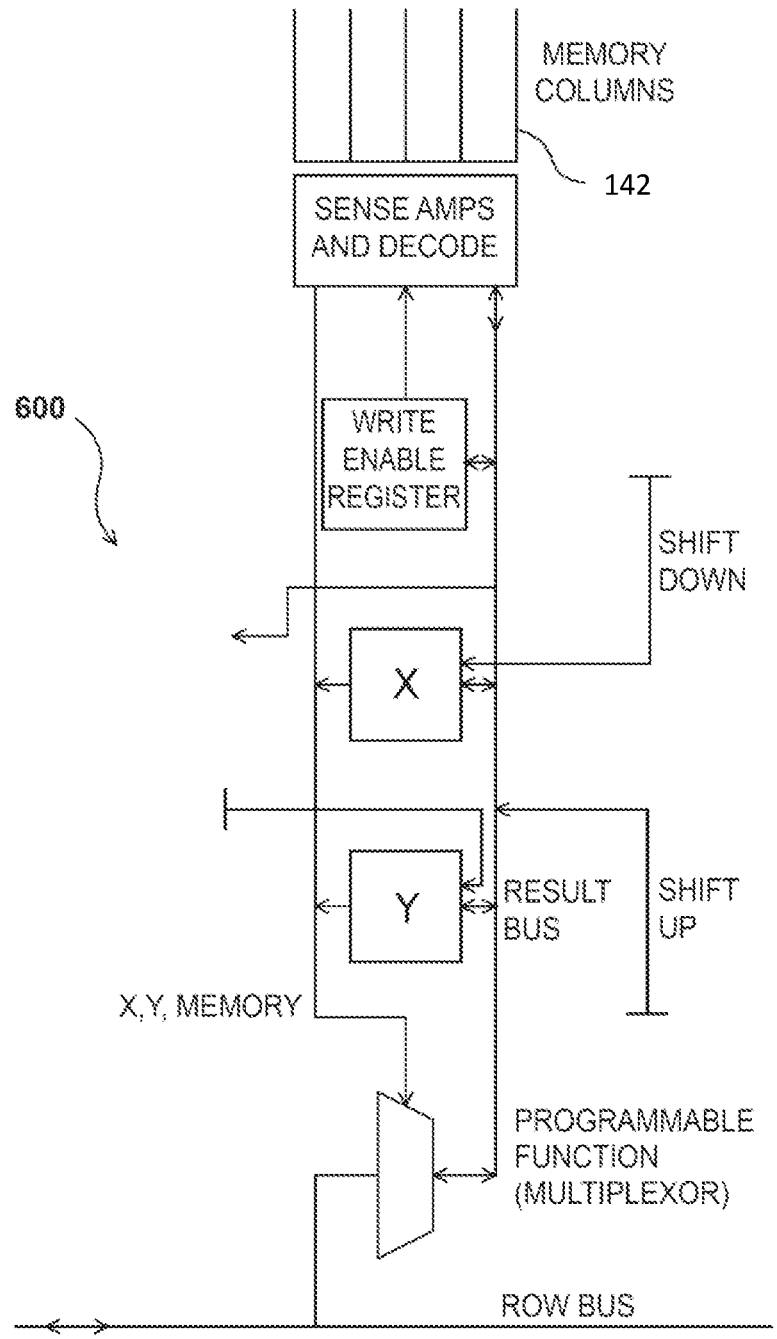
FIG. 18 is a diagram of a processing element according to the present invention having nearest-neighbor communications in the column direction.

FIG. 18 shows a processing element 600 according to the present invention having nearest-neighbor communications in the column direction. The processing element 600 may be used as a processing element 116 in a computational memory bank 100 of the present invention. The processing element 600 is similar to other devices described herein and redundant description is omitted for sake of clarity. The related description of other embodiments may be referenced, with like reference numerals denoting like components.

Nearest-neighbor communications in the column direction may be combined with row-direction nearest-neighbor communications. In some embodiments, X and Y are single registers and a 2:1 multiplexer selects whether registers X and Y pass data in the row or column direction. In other embodiments, X and Y are register banks, and different registers within the register banks X and Y may be set by neighboring processing elements 600 in the row and column directions.

Figure 19:
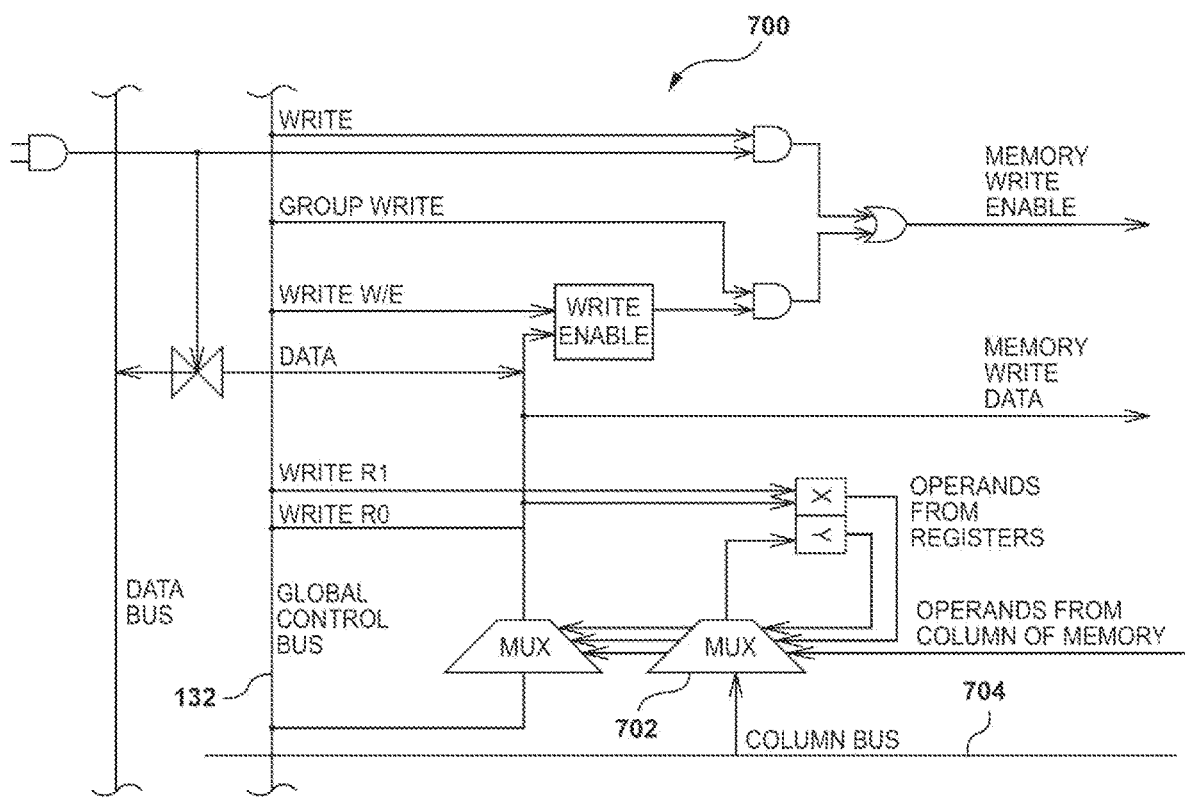
FIG. 19 is a diagram of a processing element having a second multiplexer connected to a column bus, according to the present invention.

FIG. 19 shows a processing element 700 having a second multiplexer 702 connected to a column bus 704. The processing element 700 may be used as a processing element 116 in a computational memory bank 100 of the present invention. The processing element 700 is similar to other devices described herein and redundant description is omitted for sake of clarity. The related description of other embodiments may be referenced, with like reference numerals denoting like components.

Figure 20:
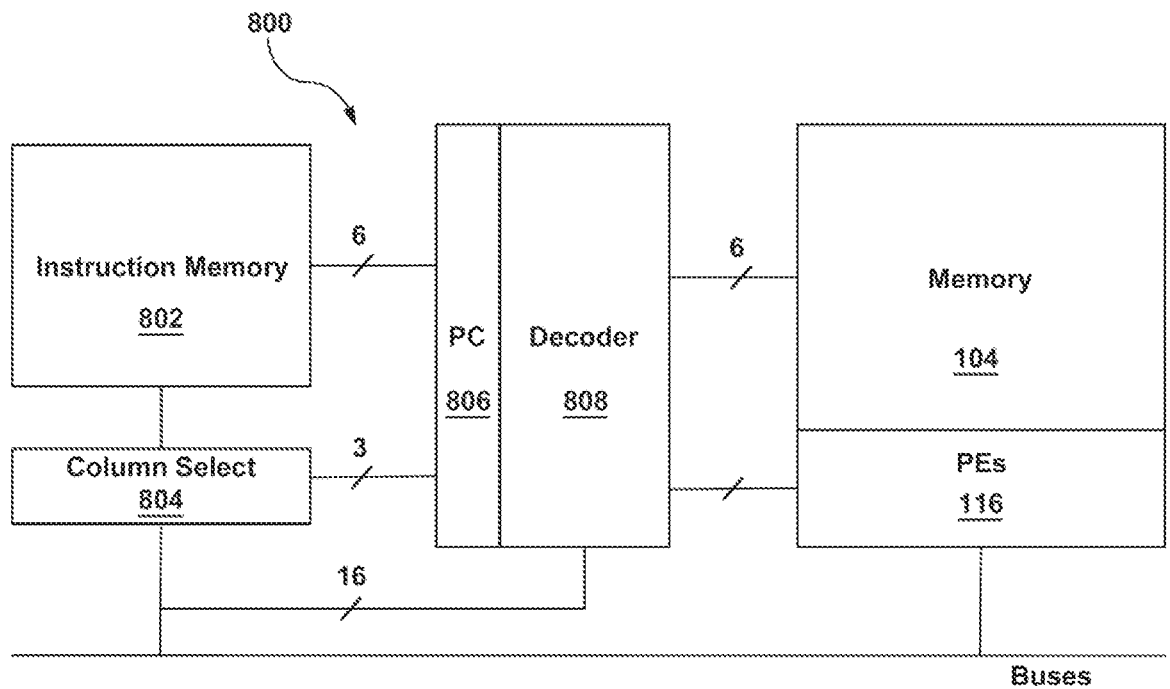
FIG. 20 is a diagram of a controller operable to drive row addresses and opcodes, and to load and save instructions in its associated row of memory, according to the present invention.

FIG. 20 shows a SIMD controller 800 operable to drive row addresses and opcodes, and to load and save instructions in an associated array of memory units 104. The SIMD controller 800 may be used as a SIMD controller 108 in a computational memory bank 100 of the present invention. The SIMD controller 800 is similar to other devices described herein and redundant description is omitted for sake of clarity. The related description of other embodiments may be referenced, with like reference numerals denoting like components.

The SIMD controller 800 includes instruction memory 802, a column select 804, a program counter 806, and a decoder 808. The decoder 808 decodes instructions and can be further include a decompressor configured to decompress instructions and/or data, which may be stored in compressed form to save memory.

The SIMD controller 800 is configured to fetch instructions as needed from the array of memory units 104 of the bank. Fetched instructions may be stored in the instruction memory 802. The instructions may indicate the control lines required by the processing elements and their associated buses, and the row addresses needed to select memory data for the processing elements.

It may be desirable during execution to fetch instructions from a memory separate from the array of memory units 104 to implement "Harvard architecture" in which instructions and, optionally, data, which may be obtained from the array of memory units 104, are fetched in parallel. Conversely, because some computations are data-heavy while others are instruction-heavy, it is advantageous to load instructions from the array of memory units 104 of the bank.

The instruction decoder 808 may be located between the instruction memory 802 and the array of memory units 104 and processing elements 116.

The SIMD controller 800 may addresses its instruction memory 802 through the program counter 806, decode what it reads with the decoder 808 and use this information to drive the array of memory units 104 and processing elements 116. Pipelining can be used to avoid having to wait for instruction read and decode before execution. An instruction set may include "OP" instructions that drive opcodes and load registers of the processing elements 116; jump instructions (e.g., JMP and JSR) that manipulate the program counter 806; address registers to allow indirect and indexed addressing; looping constructs (such as fixed-length loops), and conditional jumps.

Figure 21:
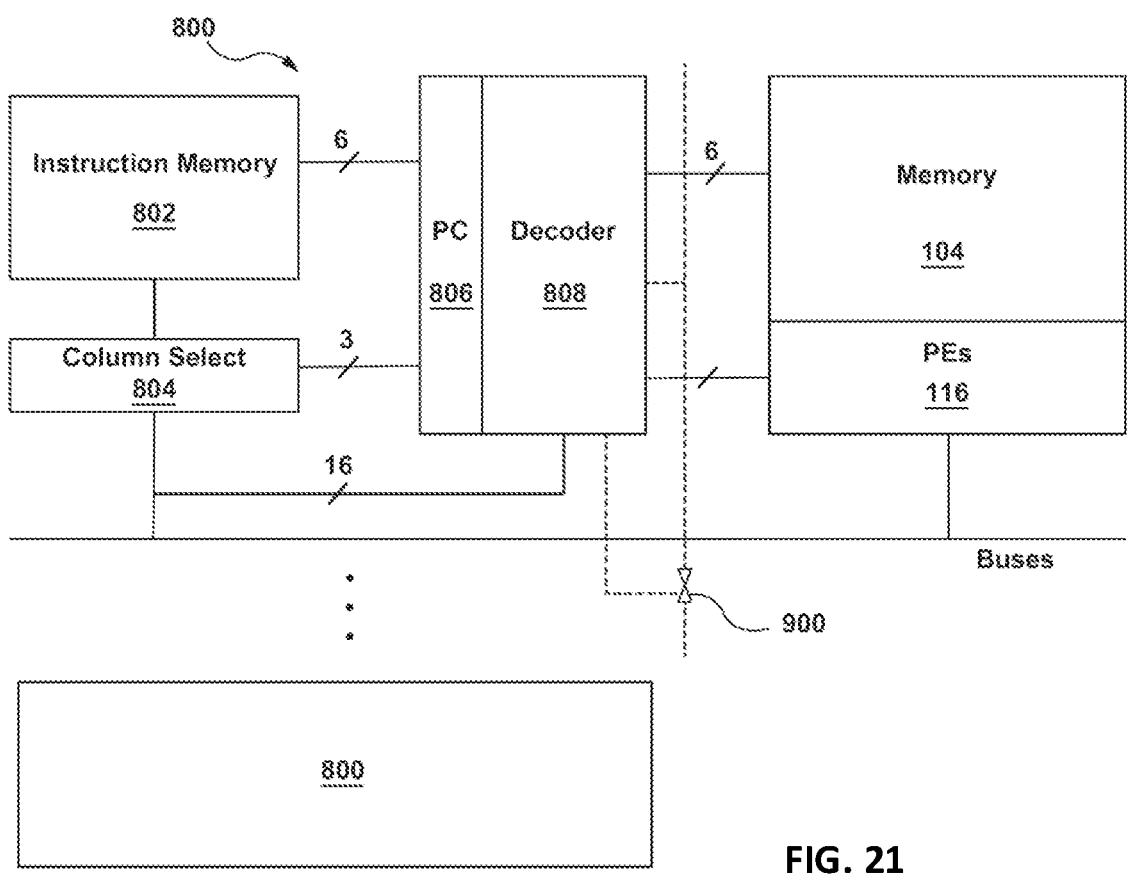
FIG. 21 is a diagram of a plurality of controllers interconnected by a column bus, each controller operable to control a bank of computational memory and together operable to permit sharing of instruction memory, according to the present invention.

FIG. 21 shows a plurality of SIMD controllers 800 interconnected by a controller bus 900. Each SIMD controller 800 is operable to control a computational memory bank 100 and the SIMD controllers 800 are together operable to permit sharing of instruction memory.

Figure 22:
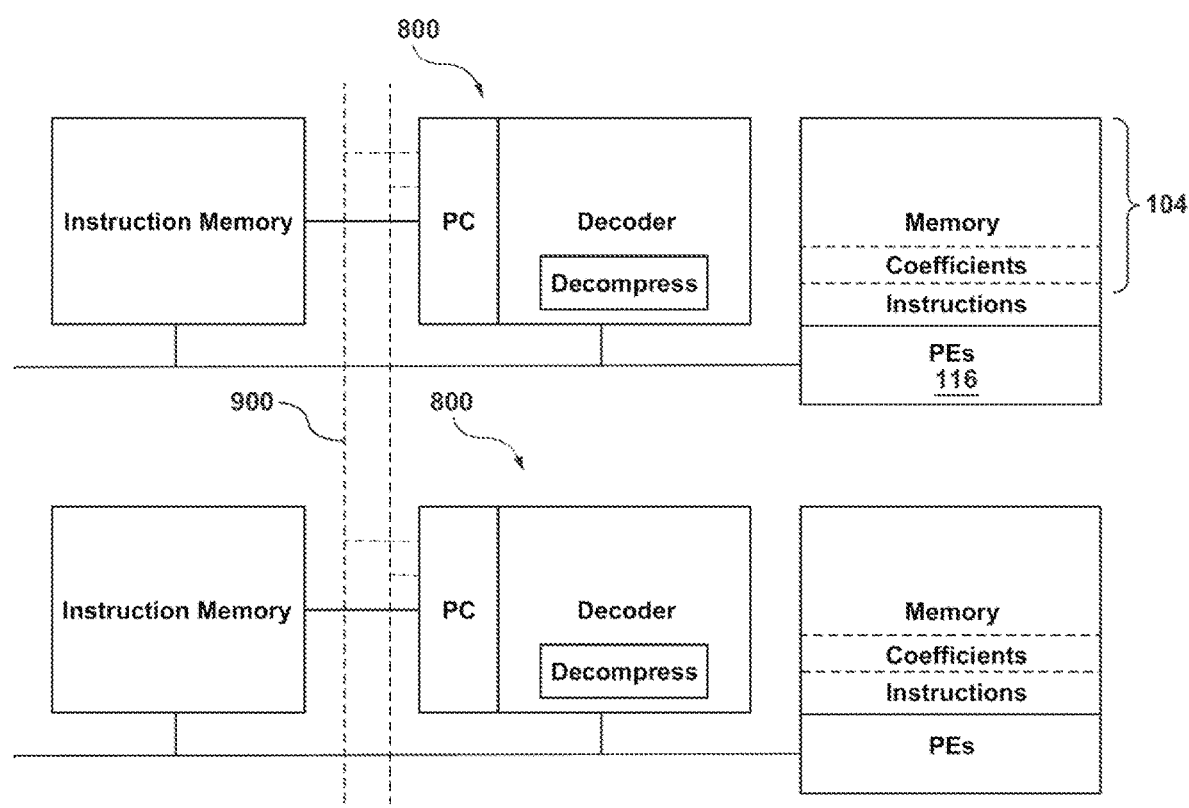
FIG. 22 is a diagram of a plurality of controllers, each further operable to decode compressed coefficient data and together operable to permit sharing of instruction memory and to reuse it as coefficient memory, according to the present invention.

FIG. 22 shows a plurality of SIMD controllers 800, each further operable to decode compressed coefficient data and together operable to permit sharing of instruction memory and to reuse instruction memory as coefficient memory.

Neural networks often require storage of a large number of coefficients, e.g., on the order of 250 million for the well-known recognition algorithm AlexNet. It is contemplated to store coefficients in compressed form (for example, storing the common special case of a zero coefficient in a single "0" bit). Decompression can be performed by a computational memory bank 100 by way of the processing elements 116 and array of memory units 104 or using a separate component, such as a decompression engine, provided to the SIMD controller 800 to read and decompress a string of variable-length compressed numbers.

Coefficient compression is useful for more than just saving space. For example, if a coefficient is zero then the associated multiply-add step of a dot product may simply be skipped, saving both time and power. Decompression may be configured to return code, in addition to or instead of, decompressed numbers. For example, decompression may be configured to return the address of a subroutine that efficiently handles the special case of the given coefficient (e.g., zero, as discussed above, or a pure bit shift) together with a register value that serves as an argument to this subroutine (e.g., the number of bits to shift).

Decompression may share instruction memory with an instruction decoder or may be provided with a separate memory. In a large-vector scenario, in which multiple SIMD controllers 800 are running the same code with the same coefficients, one controller can perform decompression while another acts as master.

Figures 23, 24:
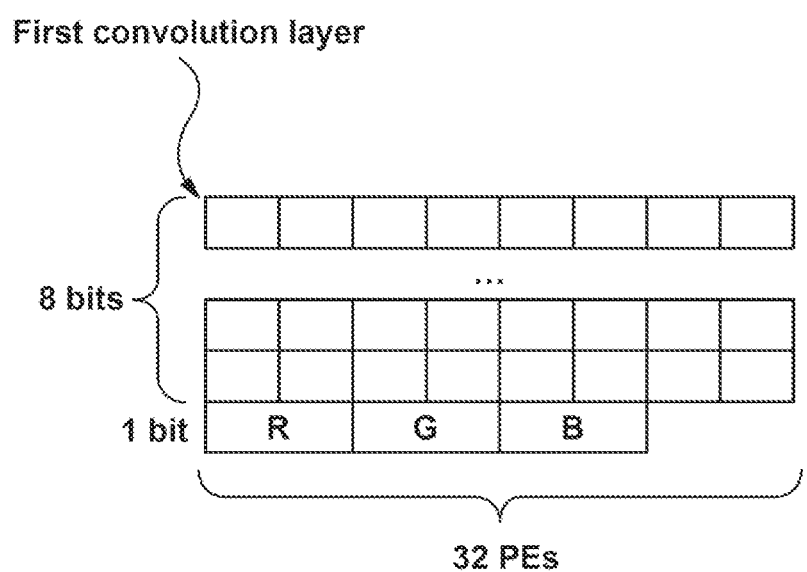
FIG. 23 is a diagram of an example layout in computational memory of pixel data for an image and associated code and kernel output data for a first layer of a neural net, according to the present invention.
FIG. 24 is a diagram of an example layout in computational memory of color pixel data and data for a convolutional layer of a neural net, according to the present invention.

FIG. 23 shows an example layout, in various computational memory banks 100, of pixel data for an image and associated code and kernel output data for a first layer of a neural network, according to the present invention.

FIG. 24 shows in detail an example layout, in a computational memory bank 100, of color pixel data and data for a convolutional layer of a neural network, according to the present invention.

Figure 25:
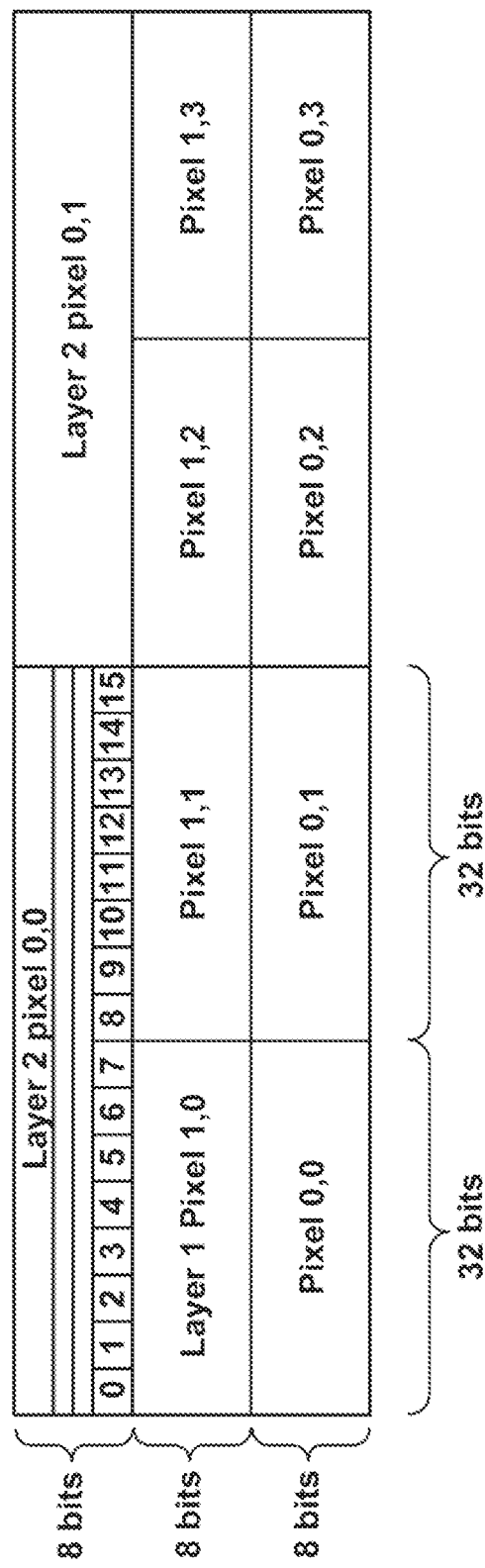
FIG. 25 is a diagram of an example layout in computational memory of data for pooling in a neural net, according to the present invention.

FIG. 25 shows an example layout, in a computational memory bank 100, of data for pooling in a neural net.

Image data in the above is indicated by tuples representing pixel coordinates. An example image size is 256 by 256 pixels.

When vectors of data to be processed are larger than a single computational memory bank 100, multiple SIMD controllers may issue the same opcodes and controls. This may be done by replicating instructions in the memories of all the relevant SIMD controllers, and using the synchronization described above to keep them locked together. A given SIMD controller may be configured to act as a master with others SIMD controller slaved to it. A controller bus may facilitate this mode of operation and the controller bus may be segmented, so that multiple groups of controllers may be independently operated in this way. Controllers in a group may be programmed to hand off master control, allowing larger programs to fit in instruction memory because it is shared rather than replicated.

In view of the above, it should be apparent that the computational memory banks, SIMD controllers, processing elements, and their interconnecting busses allow for the processing of large numbers of dot-product and related neural-network computations with flexible low-precision arithmetic, power-efficient communications, and local storage and decoding of instructions and coefficients.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A device comprising:
   a plurality of computational memory banks, each computational memory bank of the plurality of computational memory banks including an array of memory units and a plurality of processing elements connected to the array of memory units; and
   a plurality of single instruction, multiple data (SIMD) controllers, each SIMD controller of the plurality of SIMD controllers being contained within at least one computational memory bank of the plurality of computational memory banks;
   wherein each SIMD controller is to provide instructions to the at least one computational memory bank and control execution of the instructions by the at least one computational memory bank;
   wherein each processing element of the plurality of processing elements includes registers and an arithmetic logic unit (ALU) to perform operations with the registers; and
   wherein each processing element of the plurality of processing elements is to receive communicated state from registers of another processing element, the ALU to perform operations with the registers and the communicated state.

2. The device of claim 1, further comprising a bus connecting the plurality of processing elements within a computational memory bank of the plurality of computational memory banks.

3. The device of claim 2, wherein the bus is connected to a SIMD controller of the computational memory bank, and wherein the bus is configured to carry opcodes to the plurality of processing elements.

4. The device of claim 2, wherein the bus is segmented.

5. The device of claim 1, further comprising a plurality of busses, each bus operable to unidirectionally or bidirectionally communicate information among any of the SIMD controller and the plurality of processing elements, wherein at least one of the busses is segmented and at least another of the busses is not segmented.

6. The device of claim 1, further comprising a bus connecting processing elements of a computational memory bank of the plurality of computational memory banks to processing elements of another computational memory bank of the plurality of computational memory banks.

7. The device of claim 6, wherein the bus is segmented.

8. The device of claim 1, further comprising a plurality of busses, each bus operable to unidirectionally or bidirectionally communicate information among any of the computational memory banks, wherein at least one of the busses is segmented and at least another of the busses is not segmented.

9. The device of claim 1, wherein each SIMD controller is contained within a different one computational memory bank of the plurality of computational memory banks.

10. The device of claim 1, wherein a SIMD controller of the plurality of SIMD controllers is contained within at least two of the computational memory banks of the plurality of computational memory banks.

11. The device of claim 1 further comprising a bus connecting the plurality of SIMD controllers.

12. The device of claim 1, further comprising an input/output circuit connected to the plurality of SIMD controllers.

13. The device of claim 1, wherein the ALU includes multiple levels of multiplexers.

14. The device of claim 1, further comprising a bus connecting the plurality of processing elements and the SIMD controller within a computational memory bank, the bus to deliver operand selections from the SIMD controller to the ALU of each processing element.

15. The device of claim 1, further comprising a bus connecting the plurality of processing elements and the SIMD controller within a computational memory bank, the bus to communicate a function to the ALU of each processing element.

16. The device of claim 1, further comprising communications registers that are slaved to the registers, the communications registers to provide communicated state to another processing element.

17. The device of claim 1, further comprising at least one direct connection between each processing element and at least another processing element of the plurality of processing elements.

18. The device of claim 17, wherein the at least one direct connection is to provide the communicated state.

19. The device of claim 17, wherein the at least one direct connection is to allow sharing of state information that includes carry and sign information.

20. A device comprising:
a plurality of computational memory banks, each computational memory bank of the plurality of computational memory banks including an array of memory units and a plurality of processing elements connected to the array of memory units; and
a plurality of single instruction, multiple data (SIMD) controllers, each SIMD controller of the plurality of SIMD controllers being contained within at least one computational memory bank of the plurality of computational memory banks;
wherein each SIMD controller is to provide instructions to the at least one computational memory bank and control execution of the instructions by the at least one computational memory bank; and
wherein each processing element of the plurality of processing elements includes registers, and an arithmetic logic unit (ALU) to perform operations with the registers, and communications registers that are slaved to the registers, the communications registers to provide communicated state to another processing element.

* * * * *